United States Patent
Johnson et al.

(10) Patent No.: US 12,265,715 B2
(45) Date of Patent: *Apr. 1, 2025

(54) DATA STORAGE DEVICE WITH CONFIGURABLE POLICY-BASED STORAGE DEVICE BEHAVIOR

(71) Applicant: Gaea LLC, Niwot, CO (US)

(72) Inventors: Joshua Johnson, Frederick, CO (US); Curt Bruner, Niwot, CO (US); Jeffrey Reh, Niwot, CO (US); Christopher Squires, Boulder, CO (US); Brian Wilson, Zumbro Falls, CO (US)

(73) Assignee: Gaea LLC, Niwot, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/408,670

(22) Filed: Jan. 10, 2024

(65) Prior Publication Data

US 2024/0211150 A1 Jun. 27, 2024

Related U.S. Application Data

(63) Continuation of application No. 17/716,275, filed on Apr. 8, 2022, now Pat. No. 11,907,553, which is a
(Continued)

(51) Int. Cl.
*G06F 12/00* (2006.01)
*G06F 3/06* (2006.01)
(Continued)

(52) U.S. Cl.
CPC .......... *G06F 3/0632* (2013.01); *G06F 3/0604* (2013.01); *G06F 3/0658* (2013.01); *G06F 3/0659* (2013.01); *G06F 3/0665* (2013.01); *G06F 3/0673* (2013.01); *G06F 3/0674* (2013.01); *G06F 3/0676* (2013.01); *G06F 3/0679* (2013.01); *G06F 3/068* (2013.01); *G06F 9/06* (2013.01); *G06F 9/3004* (2013.01); *G06F 3/061* (2013.01); *G06F 3/0619* (2013.01)

(58) Field of Classification Search
CPC .... G06F 3/0632; G06F 3/0604; G06F 3/0658; G06F 3/0673; G06F 3/0674; G06F 3/0676; G06F 3/0679; G06F 9/06; G06F 9/3004; G06F 3/061
See application file for complete search history.

(56) References Cited

U.S. PATENT DOCUMENTS 5,596,458 A 1/1997 Emo et al.
6,195,218 B1 2/2001 Guttmann et al.
(Continued)

*Primary Examiner* — John A Lane

(57) ABSTRACT

An apparatus comprises a storage device and a device controller operatively coupled with the storage device. The device controller comprises a memory that stores an application. The application stored on the memory comprises instructions. When executed, the instruction direct the device controller to receive a storage request comprising content. The device controller retrieves a storage device policy from the memory that indicates a set of storage locations on the storage device. The device controller selects one of the storage locations on the storage device based on the storage device policy. The device controller stores the content on the storage device at the selected storage location. The device controller records storage information for the content that indicates the selected location on the memory.

20 Claims, 32 Drawing Sheets

Related U.S. Application Data continuation of application No. 16/990,433, filed on Aug. 11, 2020, now Pat. No. 11,327,669, which is a continuation of application No. 15/804,772, filed on Nov. 6, 2017, now Pat. No. 10,776,023.

(60) Provisional application No. 62/448,826, filed on Jan. 20, 2017, provisional application No. 62/418,742, filed on Nov. 7, 2016, provisional application No. 62/418,785, filed on Nov. 7, 2016, provisional application No. 62/418,687, filed on Nov. 7, 2016, provisional application No. 62/418,775, filed on Nov. 7, 2016, provisional application No. 62/418,764, filed on Nov. 7, 2016, provisional application No. 62/418,780, filed on Nov. 7, 2016, provisional application No. 62/418,510, filed on Nov. 7, 2016, provisional application No. 62/418,696, filed on Nov. 7, 2016, provisional application No. 62/418,759, filed on Nov. 7, 2016, provisional application No. 62/418,773, filed on Nov. 7, 2016, provisional application No. 62/418,730, filed on Nov. 7, 2016, provisional application No. 62/418,768, filed on Nov. 7, 2016, provisional application No. 62/418,717, filed on Nov. 7, 2016, provisional application No. 62/418,724, filed on Nov. 7, 2016, provisional application No. 62/418,561, filed on Nov. 7, 2016, provisional application No. 62/418,693, filed on Nov. 7, 2016.

(51) Int. Cl.
*G06F 9/06* (2006.01)
*G06F 9/30* (2018.01)

(56) References Cited

U.S. PATENT DOCUMENTS

| | | |
|---|---|---|
| 8,151,077 B1 | 4/2012 | Bauer et al. |
| 9,280,987 B1 | 3/2016 | Bao et al. |
| 9,449,007 B1 | 9/2016 | Wood |
| 9,619,429 B1 | 4/2017 | Wang et al. |
| 2002/0036852 A1 | 3/2002 | Leow et al. |
| 2004/0174627 A1 | 9/2004 | Kim et al. |
| 2006/0061356 A1 | 3/2006 | Makifuchi et al. |
| 2010/0100680 A1 | 4/2010 | Koseki |
| 2010/0218177 A1 | 8/2010 | Miura |
| 2014/0172930 A1 | 6/2014 | Molaro et al. |
| 2015/0052167 A1 | 2/2015 | Olster et al. |
| 2016/0313943 A1 | 10/2016 | Hashimoto et al. |
| 2017/0075909 A1 | 3/2017 | Goodson |
| 2017/0091120 A1 | 3/2017 | Gopal et al. |
| 2018/0121136 A1 | 5/2018 | Ishiyama |
| 2018/0260154 A1 | 9/2018 | Dronamraju et al. |
| 2018/0349035 A1 | 12/2018 | Ellis et al. |
| 2020/0278793 A1 | 9/2020 | Jiang et al. |
| 2020/0285396 A1 | 9/2020 | George |
| 2021/0182190 A1 | 1/2021 | Gao et al. |

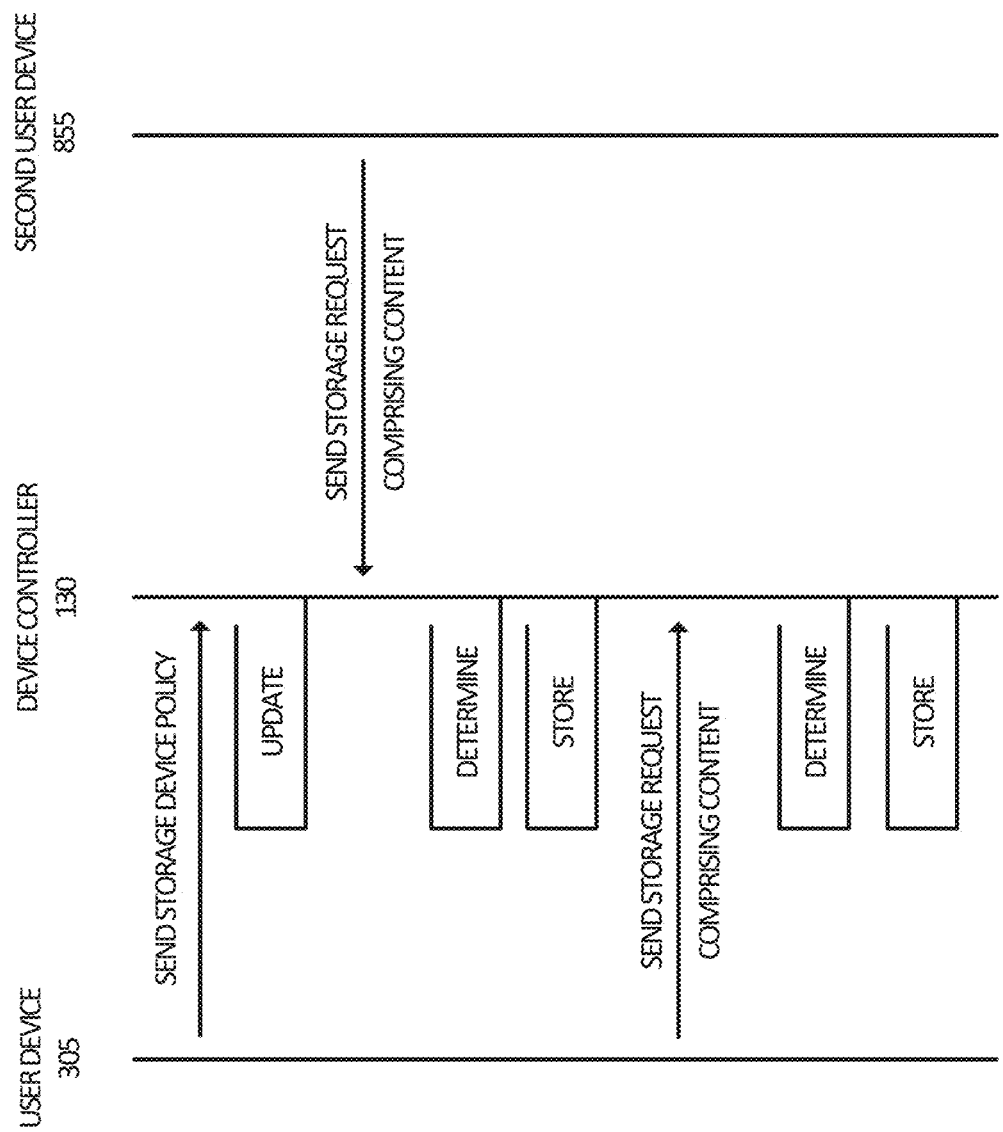

DATA STORAGE DEVICE WITH CONFIGURABLE POLICY-BASED STORAGE DEVICE BEHAVIOR

RELATED APPLICATIONS

The present application is a continuation of and claims priority to U.S. application Ser. No. 17/716,275, filed Apr. 8, 2022 which is a continuation of and claims priority to U.S. application Ser. No. 16/990,433, filed Aug. 11, 2020, now U.S. Pat. No. 11,327,669, which is a continuation of and claims priority to U.S. application Ser. No. 15/804,772, filed on Nov. 6, 2019, now U.S. Pat. No. 10,776,023; which claims priority to U.S. Provisional Patent Application Nos. 62/418,510, 62/418,561, 62/418,687, 62/418,693, 62/418,696, 62/418,717, 62/418,724, 62/418,730, 62/418,742, 62/418,759, 62/418,764, 62/418,768, 62/418,773, 62/418,775, 62/418,780, 62/418,785, all filed on Nov. 7, 2016, and to U.S. Provisional Patent Application 62/448,826, filed Jan. 20, 2017, and which are all hereby incorporated by reference in their entirety.

TECHNICAL FIELD

Aspects of the disclosure are related to data storage devices and in particular to data storage devices with configurable policy-based read and write behavior.

TECHNICAL BACKGROUND

Data storage devices come in a wide variety of technologies and configurations such as solid-state drives, hard disk drives, floppy disk drives, and the like. Each of these data storage devices is based around some type of storage medium. For example, solid-state drives are based around integrated circuit memory devices, typically NOR Flash or NAND devices. Hard disk drives and floppy disk drives are typically based around one or more magnetically coated disks. Each of these devices (DRAM, NAND, magnetic disks) has imperfections. In order to deal with these imperfections, and still have a functional and performant device, all of these devices have trade-off decisions made that affect storage space, reliability, speed, etc.

These trade-off decisions have largely been made by the manufacturer at the time of design and/or manufacture to improve consistency of their product. Consequently, end users have very little to no influence over what trade-offs are made.

OVERVIEW

In an embodiment, an apparatus comprises a storage device and a device controller operatively coupled with the storage device is provided. The device controller comprises a memory that stores an application. The application stored on the memory comprises instructions. When executed, the instruction direct the device controller to receive a storage request comprising content. The device controller retrieves a storage device policy from the memory that indicates a set of storage locations on the storage device. The device controller selects one of the storage locations on the storage device based on the storage device policy. The device controller stores the content on the storage device at the selected storage location. The device controller records storage information for the content that indicates the selected location on the memory.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 11B illustrates an operational sequence in an implementation of a policy-based write.

DETAILED DESCRIPTION

In the examples below, storage devices are discussed which allow customization of a storage device policy, thus directing how the storage device operates. This storage device policy may cover many or all aspects of operation, for example, controlling margin of error, allowing the user to make trade-offs between reliability of storage and volume of storage. Additionally, the storage device policy may cover details of the write or read processes, allowing a user to customize the operation of the storage device. Further, the storage device policy may control where content is stored within the storage device (layout), granting the user further control over the read/write process.

User, as used herein, refers to more than just a human user. Rather, user refers to any type of entity that can interact with the devices described herein. User could include, but is not limited to, a human user, a network machine, or an artificial intelligence-based machine, for example.

From a technical perspective, currently available solutions for data storage allow only extremely minimal configuration of read/write policies within a storage device. Nor do they allow users to direct the read/write process within the storage device.

Figure 1A:
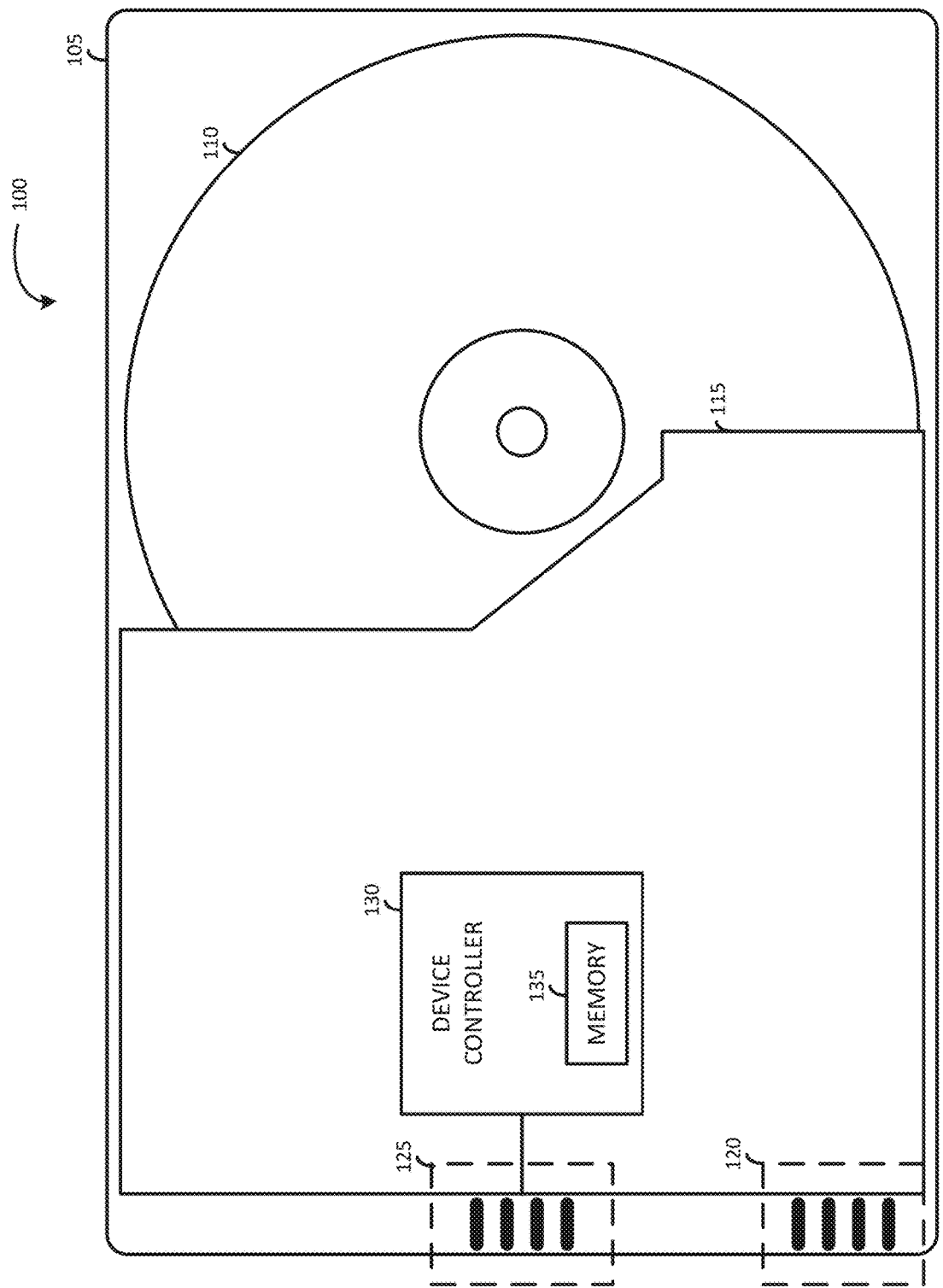
FIG. 1A illustrates a hard disk drive.

In a first example, FIG. 1A illustrates drive 100, which is illustrated here as a hard disk drive including a storage media 110 having a magnetic surface. In this example, drive 100 includes case 105, which physically supports the storage media 110, the device controller 130, a memory 135, interface connectors 125, and connector 120.

In an implementation, drive 100 includes storage media 110 having a magnetic surface including a plurality of zones or recording locations, a read/write transducer associated with the magnetic surface for reading and writing data in tracks in the plurality of zones, a actuator arm configured to support and position read/write transducer at a plurality of locations above the magnetic surface, and device controller 130 coupled to a memory 135.

In an implementation, device controller 130 is significantly more than a traditional hard disk controller. A traditional hard disk controller is a device that must be attached to a host controller and is only capable of responding to host controller commands. Device controller 130 includes all the functionality of a traditional hard disk controller, with additional functionality allowing it to run additional code and/or applications. This additional functionality may exist due to additional processing hardware in the hard disk controller. Device controller 130 may be in the form of a hard disk controller linked with a separate processor chip. Alternatively, device controller 130 could be in the form of a computing system, such as that described in FIG. 12. When device controller is represented by the computing system described in FIG. 12, it should be noted that the storage system 1203 may be represented by memory 135. In other words, while there may be a storage system 1203 within device controller 130 and an additional memory 135, this is not necessary—the memory 135 may already be represented within FIG. 12 as storage system 1203. In an implementation, device controller 130 may be in the form of a computing system as described in FIG. 12 with a learning algorithm or artificial intelligence (AI) loaded thereon. In either case, device controller is configured at least to handle the operations that a traditional hard disk controller handles, i.e. it is configured to control the actuator arm and read/write transducer (or other hardware as needed) to read and write data on storage media 110.

Device controller 130 is connected to interface connector 125 such that Device controller can communicate in any manner a storage device and/or storage server may communicate including, for example via login (telnet, ssh, etc.), via file sharing service (NFS, SAMBA, FTP, etc.), via an Object Storage API (S3, SWIFT, etc.) or via any other protocol or service that can be run over the interface. The interface connector 125, could be for example, an Ethernet connector configured to communicate over an Ethernet network. In an implementation, the connector and network could work with Ethernet, Infiniband, Fibre Channel, Omni-Path, or any other network technology. Further, device controller 130 may be loaded with any selection of firmware or software. In an implementation, an operating system, and/or virtual machine hosting layer, such as Linux, Windows, etc., is loaded on the device controller 130, allowing a user to load any software of their choosing on the device controller 130.

In addition to interface connector 125, drive 100 also includes a connector 120 which may include power connectors to power drive 100 or other communication connectors. While this is shown as a separate connector from interface connector 125, it should be understood that the functionality of interface connector 125 and connector 120 can be combined in one physical connector or separated into a plurality of connectors.

Figure 1B:
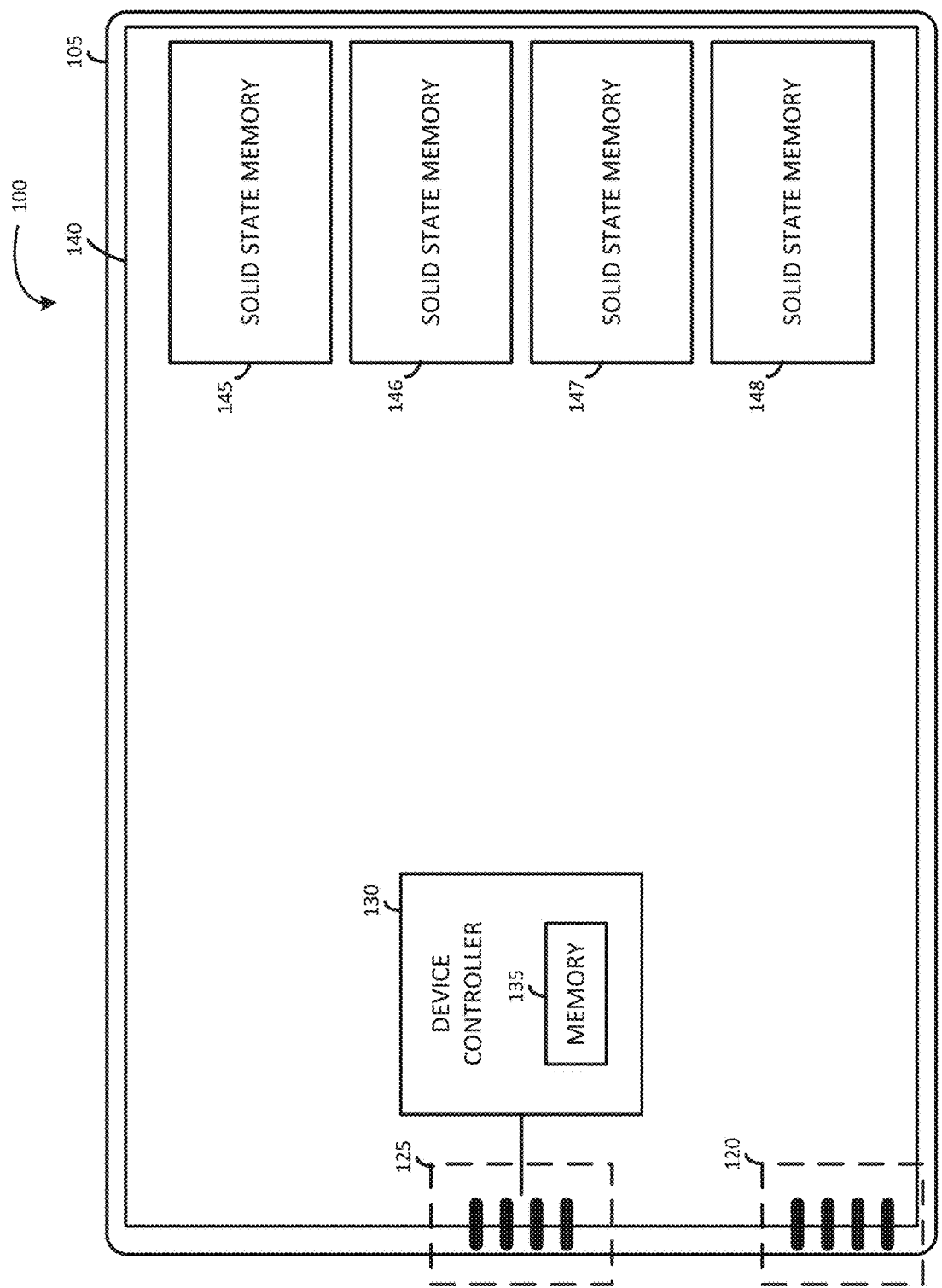
FIG. 1B illustrates solid state drive.

Turning to FIG. 1B, drive 100 utilizes solid-state storage media according to an implementation. It should be noted that, while some of the hardware presented in FIGS. 1A and 1B differs, the applicability to the concepts presented herein remains consistent across the drives shown. Consequently, drive 100 is shown in both FIG. 1A and FIG. 1B. Drive 100 is relevant to the discussion herein regardless of whether the storage media 110 is magnetic disk as shown in FIG. 1A, or solid-state memory 145-148 as shown in FIG. 1B, or some other type of storage media 110 not explicitly shown herein.

In an implementation, drive 100 optionally includes a case 105, which physically supports printed-circuit board 140, interface connector 125 and connector 120. Solid-state memory 145-148, as well as the device controller 130 and memory 135, are mounted on the printed-circuit board 140. In FIG. 1B, solid-state memory 145-149 are shown as four memory elements. This disclosure is not limited to four elements and could be any number of physical elements in any arrangement (i.e. busses, hierarchical, etc.).

Printed-circuit board 140 is also connected to interface connector 125 and connector 120. Interface connector 125 is structured to allow drive 100 to connect to a network fabric, such as through a cable and/or backplane. In an implementation, the interface connector may be in the form of an RJ45, QSFP, or CXP connector, to which copper wiring or optical fiber optic cable can connect, for example. It should be understood that any form of physical connector can be used that allows drive 100 to connect to a network. The interface connector may comprise a wireless module, such as a Wifi, Zigbee, etc. module through which the device controller 130 can connect to a network. In this way, the interface connector can connect to a network. The interface connector 125 is electrically and communicatively connected to the device controller 130, which is connected to memory 135. As in FIG. 1A, the device controller can be in the form of a computing system, such as that presented in FIG. 12. As the computing system presented in FIG. 12 already includes a storage system 1203, this can represent the same element as memory 135.

In addition to interface connector 125, drive 100 also includes a connector 120 which may include power connectors to power drive 100 or other communication connectors. As in FIG. 1A, while this is shown as a separate connector from interface connector 125, it should be understood that the functionality of interface connector 125 and connector 120 can be combined in one physical connector or separated into a plurality of connectors.

Figure 2A:
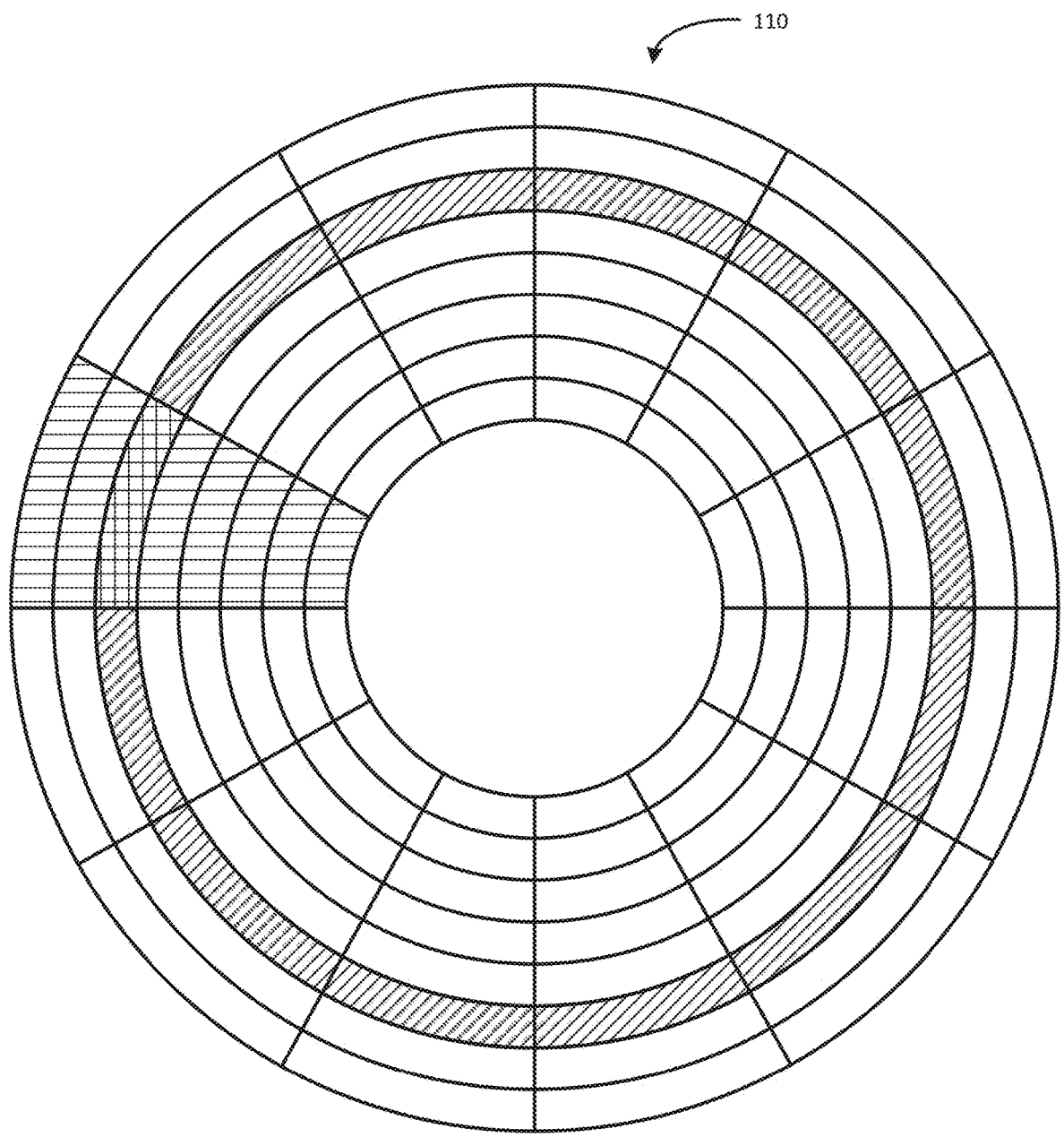
FIG. 2A illustrates a disk mapping from a hard disk drive.

FIG. 2A illustrates magnetic storage media 110 within drive 100 of FIG. 1A. In this example implementation, storage media 110 includes a physical disk upon which a magnetic surface resides. Content is written to, and read from storage media 110. The disk (storage media 110) spins. At the same time, an actuator moves the read/write head between the inner and outer edges of the disk. Content can be read and recorded in any pattern around the disk (i.e. circumferential, spiral, sinusoidal, etc.).

While FIG. 2A was drawn to show the general function of storage media 110, in an implementation in which storage media 110 is a magnetic disk, it should be understood that storage media 110 can be implemented in any form of media, such as the solid-state media shown in FIG. 2A and the result of the present disclosure would be the same. Whatever media may be used for storage media 110 allows content to be stored on storage media 110 in such a way that it can be retrieved at a later time.

Figure 2B:
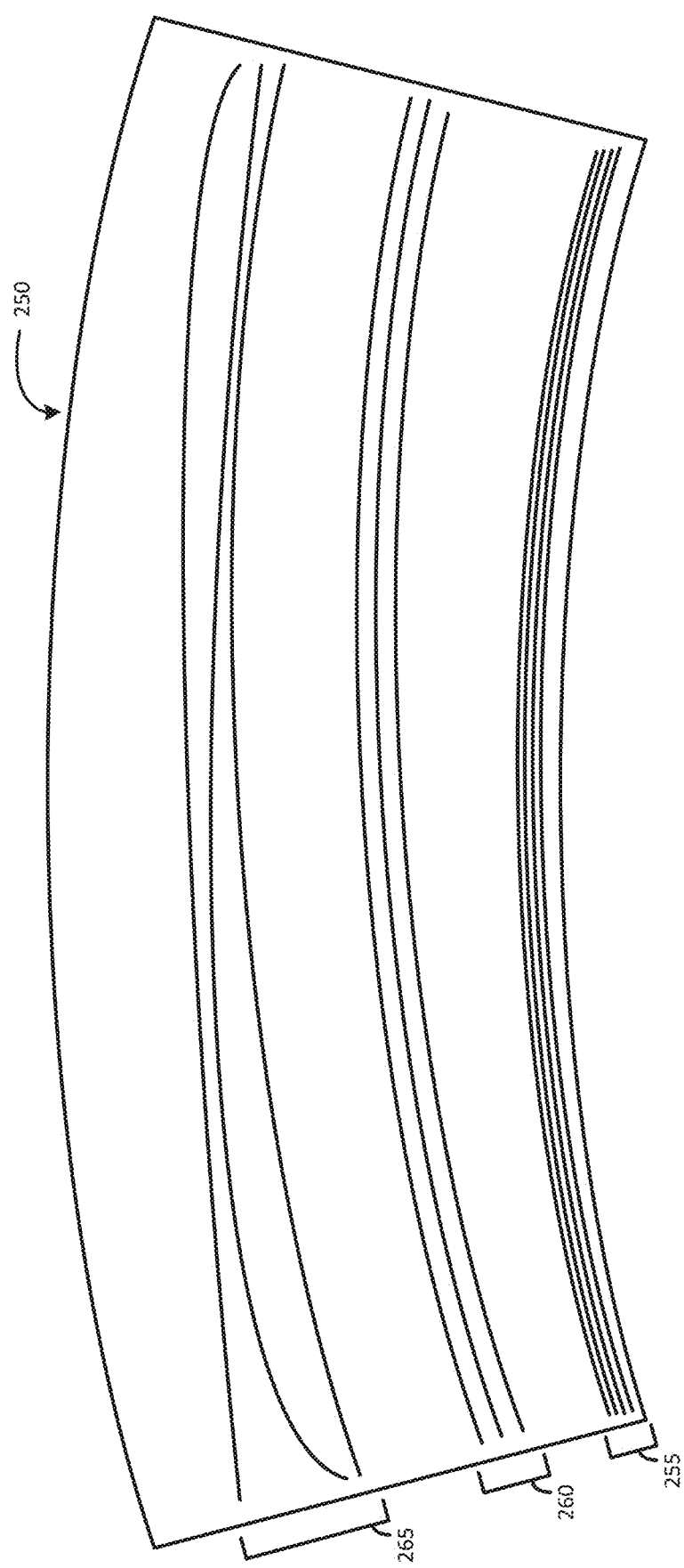
FIG. 2B illustrates multiple recording patterns on a hard disk.

FIG. 2B shows an expanded view of storage media 110 in the form of a magnetic disk. Recording patterns 255, 260 and 265 show partial samples of recorded tracks of content on storage media 110. All of the recording patterns 255, 260 and 265 are shown in a roughly spiral or circular pattern around the storage media 110. Recording pattern 255 is recorded in a tight spiral around the storage media 110. The recording pattern could scribe circles around storage media 110 rather than spirals. According to an implementation, the content could be recorded in any pattern.

The recording pattern 255 is shown with recording path that records very close the other recording paths. Recording pattern 260 shows paths that are significantly farther apart. Storage media 110 utilizes a magnetic surface for recording content. Depending on the size of the recording head, that content will take some amount of physical space. If two recording paths are recorded too close together, then the paths may interfere with each other, causing the content in one or both of the recording paths to become corrupted. Recording pattern 260, for example, will have a much lower likelihood of the recording paths interfering with each other to compromise the content on either of the paths. Recording pattern 255 creates a much higher likelihood of compromised content due to the recording paths being too close together. However, recording pattern 255 can store more content than will recording pattern 260 in a similar area. The amount of content stored corresponds directly to the density of recording paths utilized (Assuming the same read/write methodology, etc.) Thus, the path scribed by recording pattern 255 allows significantly more content to be stored. This creates a trade-off decision when deciding how to store content on storage media 110. One can choose to keep recording paths very tight in order to accommodate more content at the risk that the content will be compromised, or one could alternately choose to decrease the amount of content to be stored while also decreasing the chance of corruption of the content.

In an implementation, instead of varying the density of recording paths, the frequency of recorded bits along the paths may be varied. Similar to the concepts discussed above, if the frequency of the recording (i.e. bits per physical length, such as bits per inch) may be varied. By increasing the number of bits per inch that are recorded, storage capacity in increased, but data integrity may be degraded. In a further implementation, both of these variables may be adjusted to increase or decrease recording density. Regardless of the recording method chosen, the device controller 130 can utilize the storage device policy to make these trade-offs.

Historically, this trade-off decision has been made by drive manufacturers based on their own set of priorities. Priorities differ among different users, though. For example, a home user, such as an individual using a hard drive on a personal computer may have only one copy of content stored on the hard drive. For such a user, content integrity is very valuable, so the user would likely prefer that the possibility of content corruption be limited as much as possible. On the other hand, as an example, the owner of a large bank of hard drives that support cloud storage, may be much less concerned about the integrity of the content, and much more concerned with the amount of content able to be stored. This may be due to redundancies in the cloud storage system that allow the user to compensate for compromised content more easily. The space available to store data is of high concern to such a user, though, due to the large amount of data storage needed.

In addition to the possibility of recording paths interfering with each other, storage space competes with the possibility of imperfections in storage media 110. Imperfections in the magnetic coating, or other imperfections in storage media 110 can make it impossible to store content on certain areas of storage media 110. This may mean that a sector is entirely unusable, and the sector can just be eliminated from the mapping of storage media 110. Alternatively, there could be areas of storage media 110 that have minor imperfections that may be dealt with differently. Recording pattern 265 shows an implementation that allows for imperfections in storage media 110. By scanning storage media 110, device controller 130 can identify areas of storage media 110 with imperfections. In an implementation, device controller 130 can then select recording paths such as recording pattern 265 that avoid imperfections in storage media 110. It should be noted that device controller 130 requires more detailed mapping records or storage information than may be required for a simple path of storage, such as recording pattern 255 or recording pattern 260. Nevertheless, device controller 130 can improve storage capacity and reduce content corruption by having the flexibility to avoid areas of imperfection.

In an implementation, device controller 130 can choose to record content less densely (such as in recording pattern 260) in areas with potential imperfections, while recording content more densely (such as in recording pattern 255) in areas without imperfections. These trade-off decisions can all be made by device controller 130, which can be customized by an end user prior to data being stored, or at the time the data is stored. Furthermore, it may perform different or alternate procedures even on the same storage media surface.

While the recording process differs for different types of storage media, the concept applies to all types of storage media. For example, if the solid-state memory from FIG. 1B is utilized, the recording paths discussed may be inapplicable. The idea of imperfections within the storage media still applies, though. In solid-state memory devices, such as solid-state memory 145-148 in FIG. 1B, certain blocks of memory, or certain cells may be imperfect. Historically, solid state drives had to set aside a significant amount of over-provisioned storage blocks to use in place of imperfect cells or blocks. In an implementation these over-provisioned storage blocks can be customized and adjusted prior to, or at the time the data is stored to more accurately reflect a user's trade-off choices.

As another example of a trade-off decision, Error-Correcting Code (ECC) requirements can be changed. ECC requirements can be heightened for important content, and can be softened for less important content.

It should be understood that any type of storage media 110 may have its own trade-off choices depending on the particular storage media 110. Regardless of the particular trade-off choices available to be made, the discussion herein facilitates handling these trade-off choices.

Figure 3:
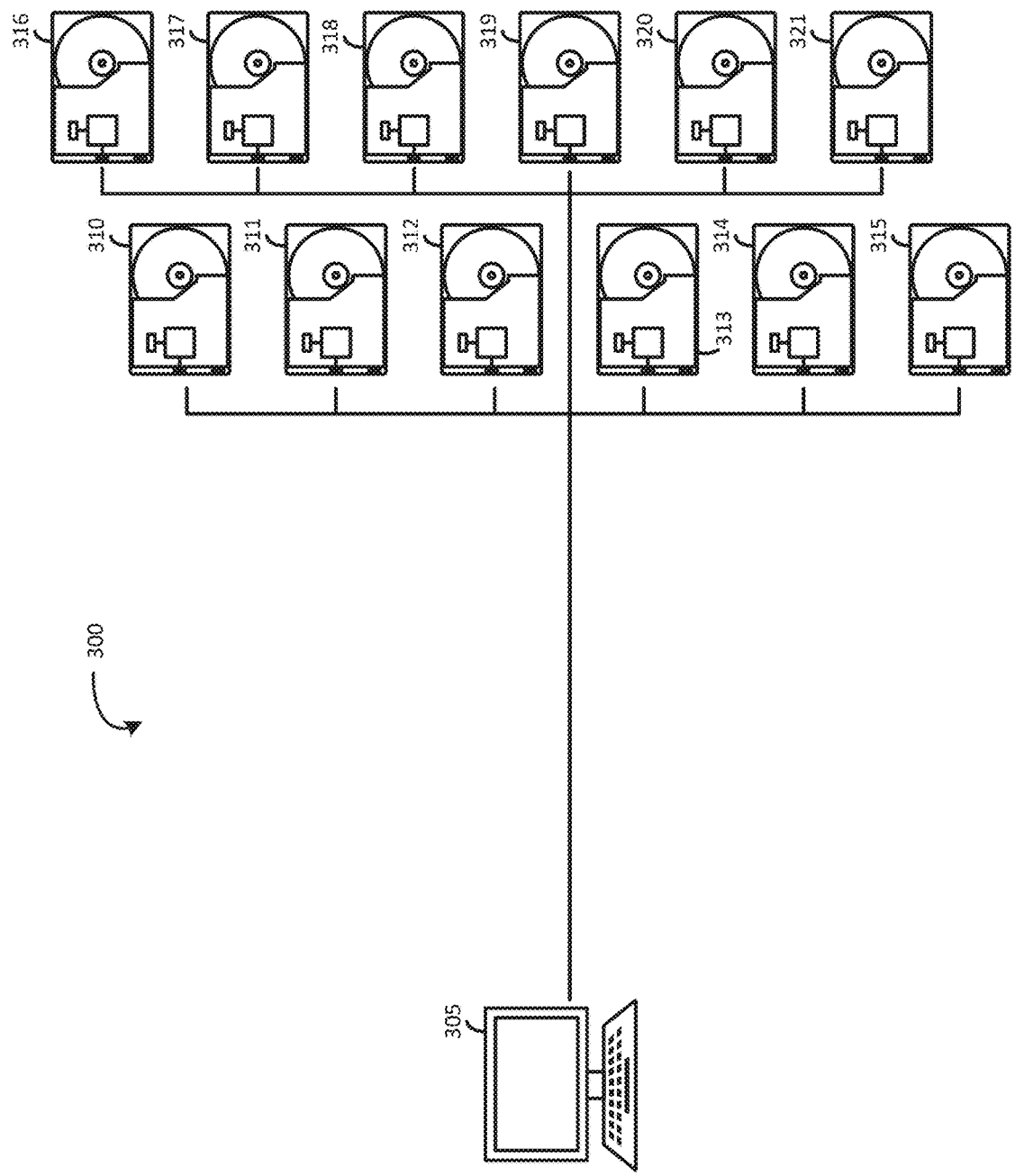
FIG. 3 illustrates a storage array according to an implementation.

FIG. 3 shows a storage array 300. In an implementation, multiple storage drives, such as drives 310-321 are connected together in an array to create a large amount of available storage. Such an array may be used for cloud storage support, for example. While each of the drives 310-321 in FIG. 3 is shown as a disk drive such as drive 100 shown in FIG. 1A, these drives could be any combination of drives, such as hard disk drives, solid-state drives, etc. Similarly, while 12 drives 310-321 are shown, the storage array 300 could include any number of drives. The drives 310-321 are connected to a user device 305. User device 305 could be any type of network device with a network connection. Historically an array such as the storage array shown in FIG. 3 would require a storage controller in the place of user device 305. Since historically the device controller 130 only worked with a compatible storage controller, a storage controller was required to manage read/write data for the drives 310-321. In this disclosure, the device controller 130 includes capabilities beyond the historical abilities of physically managing the disk read/write process to include the ability to execute code and perform operations that were formerly the purview of the host and host controller. Therefore, each of the drives 310-321 can function independently of user device 305. Thus, each of drives 310-321 can independently connect to a network or networks, and operate as an independent network device.

Additionally, since each of drives 310-321 includes interface connectors and is configured to communicate directly through a communications capable link, the connection between user device 305 and each of drives 310-321 (and between each of drives 310-321) is a communications connection, not an interface limited to a storage only protocol. This allows for standard network communication to occur between all devices. The device controller 130 can be configured to interact with any network and interact with one or many devices over one or many protocols.

By having the device controller 130 function independently, storage array 300 gains many operational advantages. In an implementation, by enabling the device controller to function independently and communicate over a network, the need for a storage controller is eliminated. Further, drives 310-321 are enabled to have independent storage policies that can maximize efficiency of each node as is required/desired for the aggregate array.

For example, if one drive, such as drive 310 is configured to store medical records, the device controller in drive 310 can be configured to optimize reliability for medical record storage. This might include recording content less densely, in order to reduce content corruption. It might also include storage information identifying the drive as non-rewriteable, so the data will not be overwritten and erased in the future. Similarly, the device controller might require password authorization in order to retrieve the content from the drive, or the drive could encode all content stored on the drive to protect privacy.

In another implementation, a drive, such as drive 311, could be configured as a drive to store on-line temporal video data. In this case, the drive may be configured to store data very densely, as there may be little concern over content corruption. Similarly, the drive 311 may be configured with little to no security for short-lived, redundant or cached data. The device controller could further be configured to differentiate between short-lived, redundant or cached data, and online shopping financial content, such as credit card data, etc. In this case, the online cached images or video data may be recorded with little to no security, while the online shopping financial data may be recorded with a high level of security. Again, this functionality can be customized to fit the needs and values of the user, and can be applied prior to or on-demand as the data is read from or written to the device. These different data types may be separated by drive, such as drives 311, 312, 313, etc., or the data may be interspersed within the same drive. In either case, the storage device policy can cause the content to be stored according to the correct trade-off choices.

Each of the drives 310-321 may additionally have differing recording properties. For example, if drive 313 is older than drive 314, it may have an older recording head, which doesn't allow data to be stored as densely as drive 314. The storage device policy can manage these varying properties.

Figure 4A:
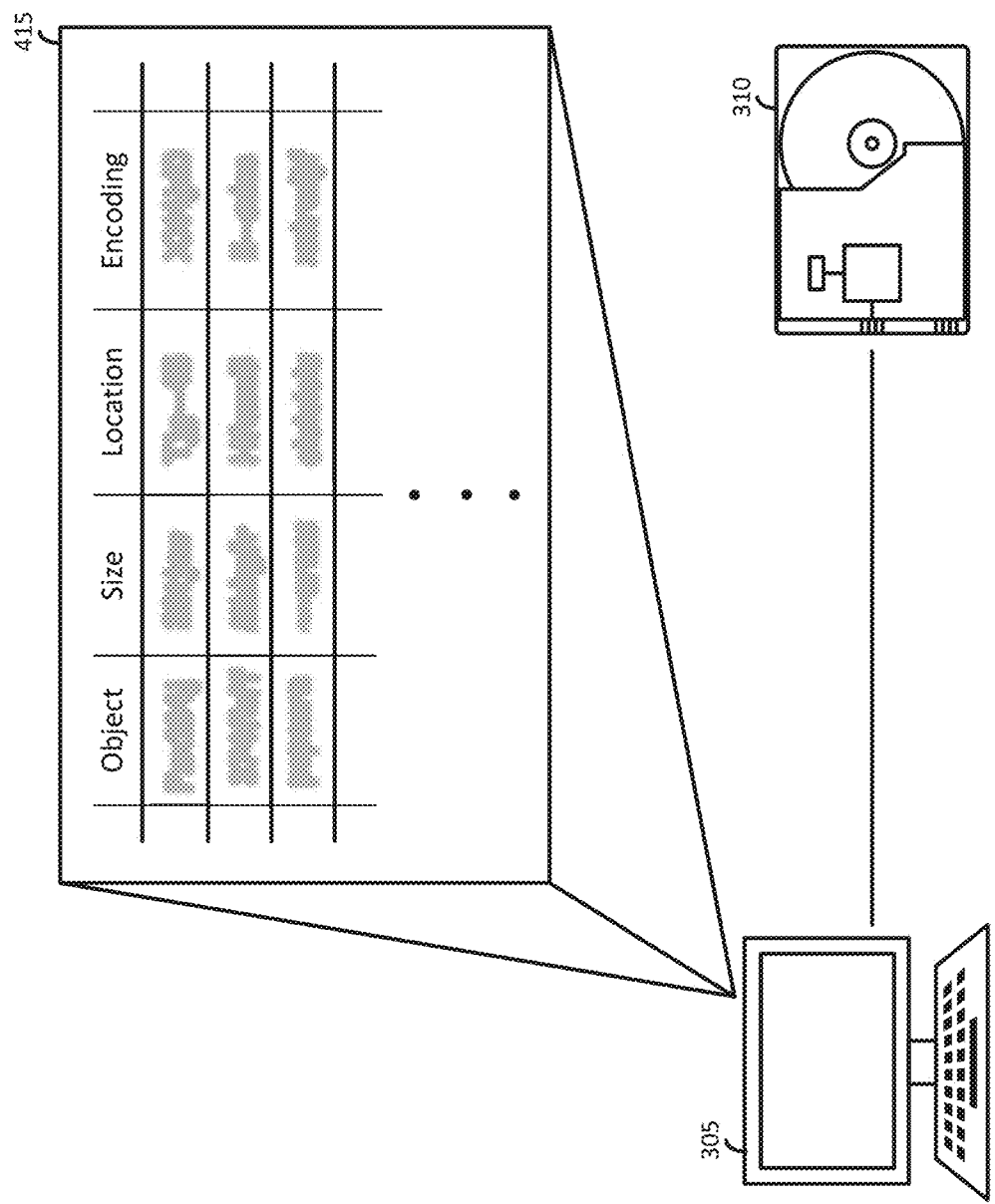
FIG. 4A illustrates a data storage arrangement according to an implementation.
Figure 4B:
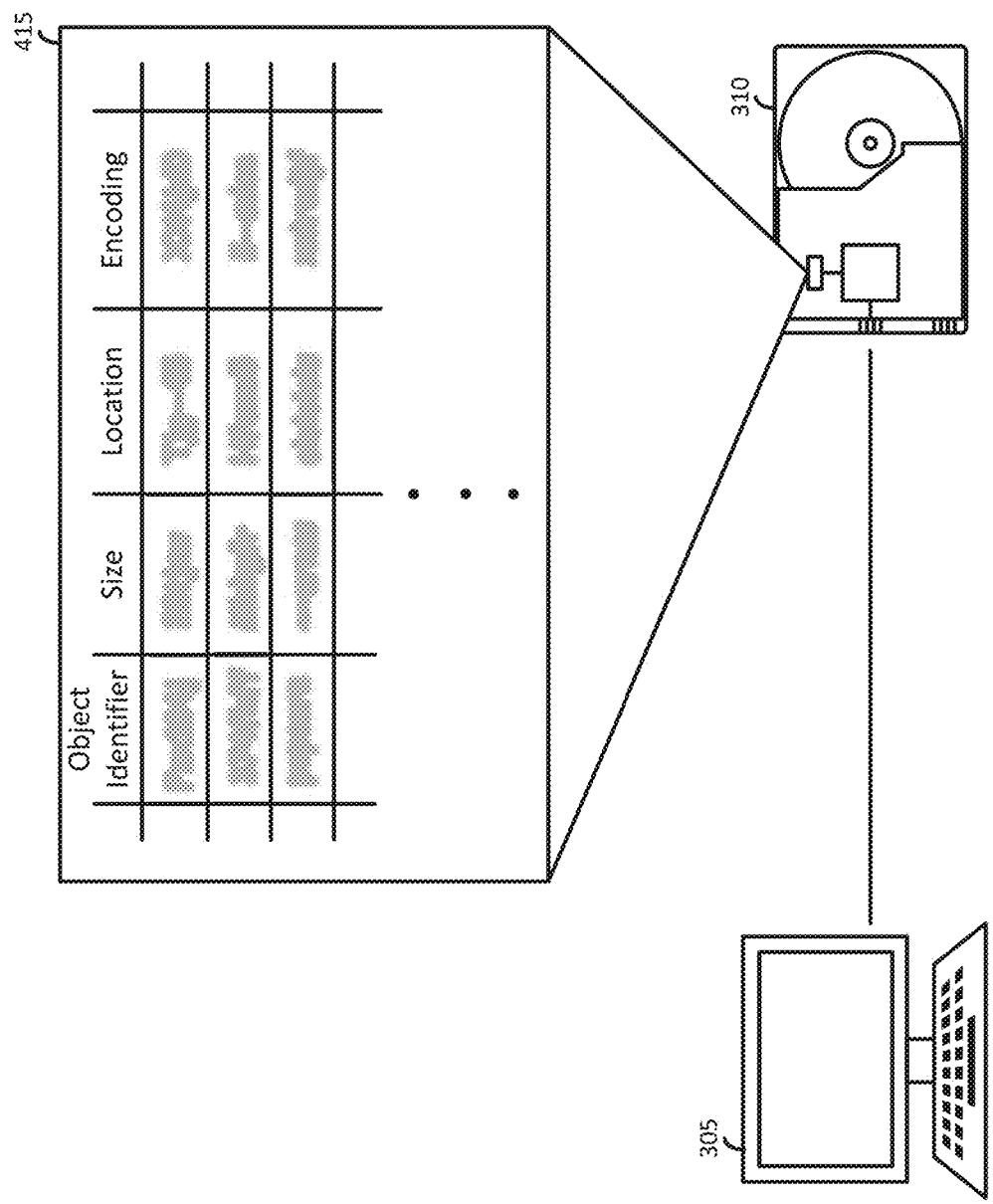
FIG. 4B illustrates a data storage arrangement according to an implementation.

FIGS. 4A and 4B illustrate data storage arrangements. Historically, when a user device 305 writes data to a drive, the user device 305 provides the drive the LBA (Logical Block Address) of where to write the content. The drive then maps the LBA to a PBA (Physical Block Address). The device controller 130, according to an implementation, is capable of managing significantly more storage information. This storage information may contain, for example, an object identifier, the size of the content stored, a location in which the content was stored, encoding information (including an encryption key, etc.), among many other elements. As discussed above, the location where the object is stored may include a simple start location, or it may be more complex, such as a starting point together with angle information, or even a complete mapping of the path of the content storage.

FIG. 4B illustrates that in an implementation, the storage information is stored in the device controller. As in FIG. 4A, the storage information may include a number of elements, particularly when, as disclosed herein, the device controller is customizable to allow the user to make trade-off decisions about the storage of content.

Figure 4C:
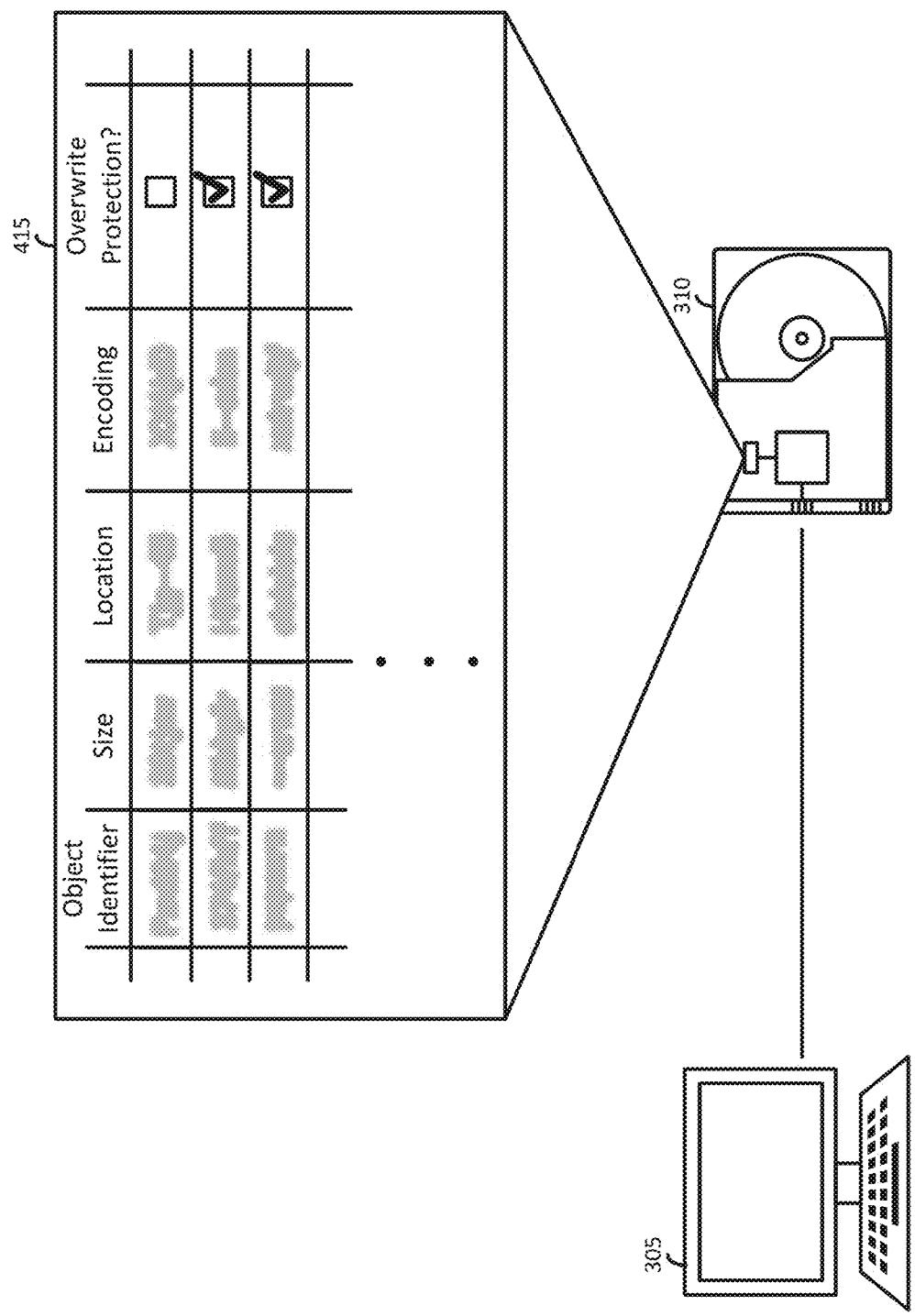
FIG. 4C illustrates a data storage arrangement according to an implementation.

FIG. 4C illustrates the storage information stored within the device controller including an entry for overwrite protection. This selection could be made for the entire drive 100, for individual tracks or sectors or regions, or individually by object or read/write request for example.

Figure 4D:
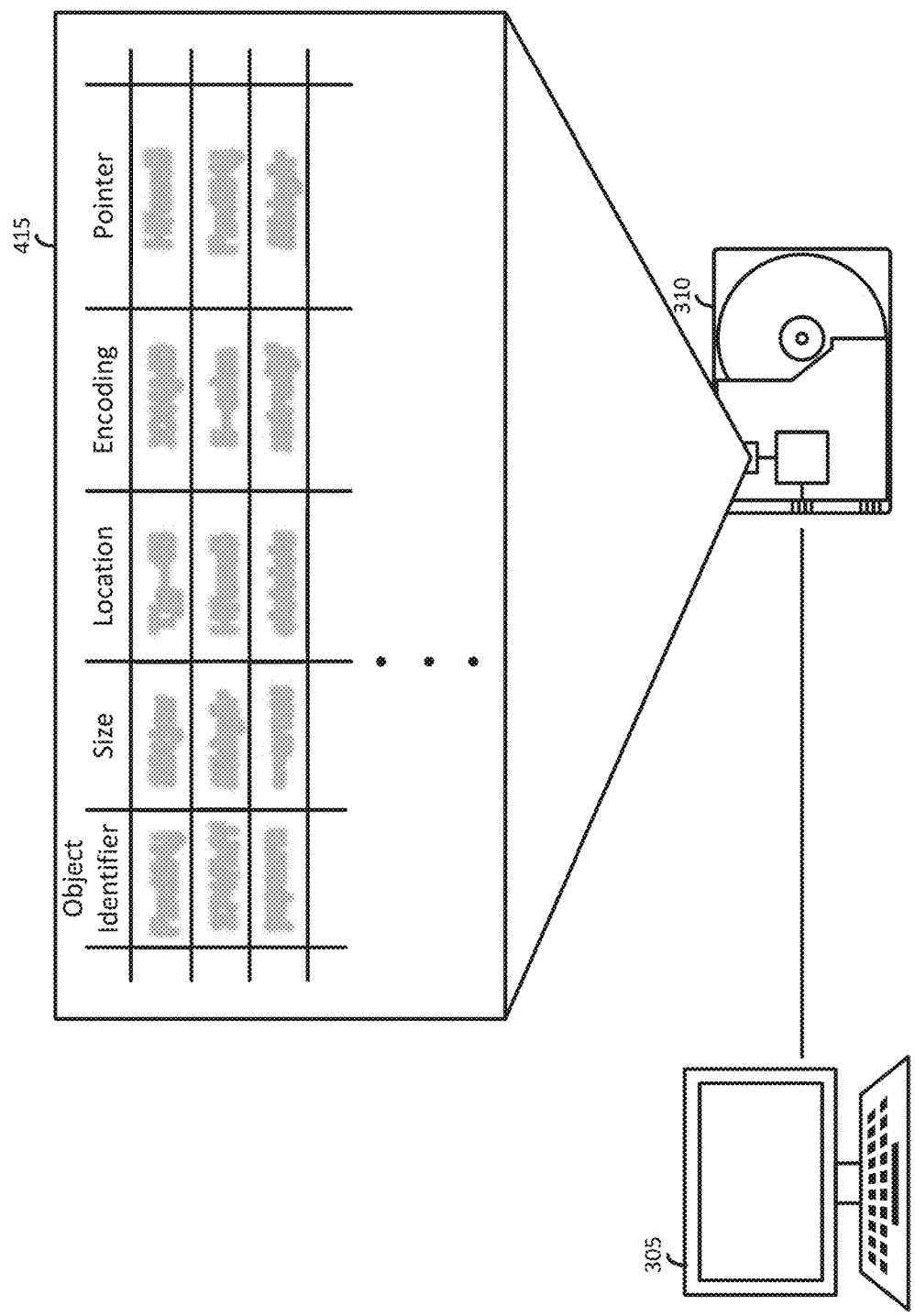
FIG. 4D illustrates a data storage arrangement according to an implementation.

FIG. 4D illustrates that in an implementation, the storage information stored in device controller 130 may also include a pointer to a location storing full storage information for content stored within storage media 110. This pointer information may be consistent for the entire drive 100, or may be made by sector, track, region, or object. In an implementation, the remaining storage information (other than object identifier and pointer) may not be stored in the device controller 130. The pointer may additionally be in any form, for example a network address that will not function when a hard drive is removed from a particular context (i.e. the network, an internet address, etc.).

Figure 4E:
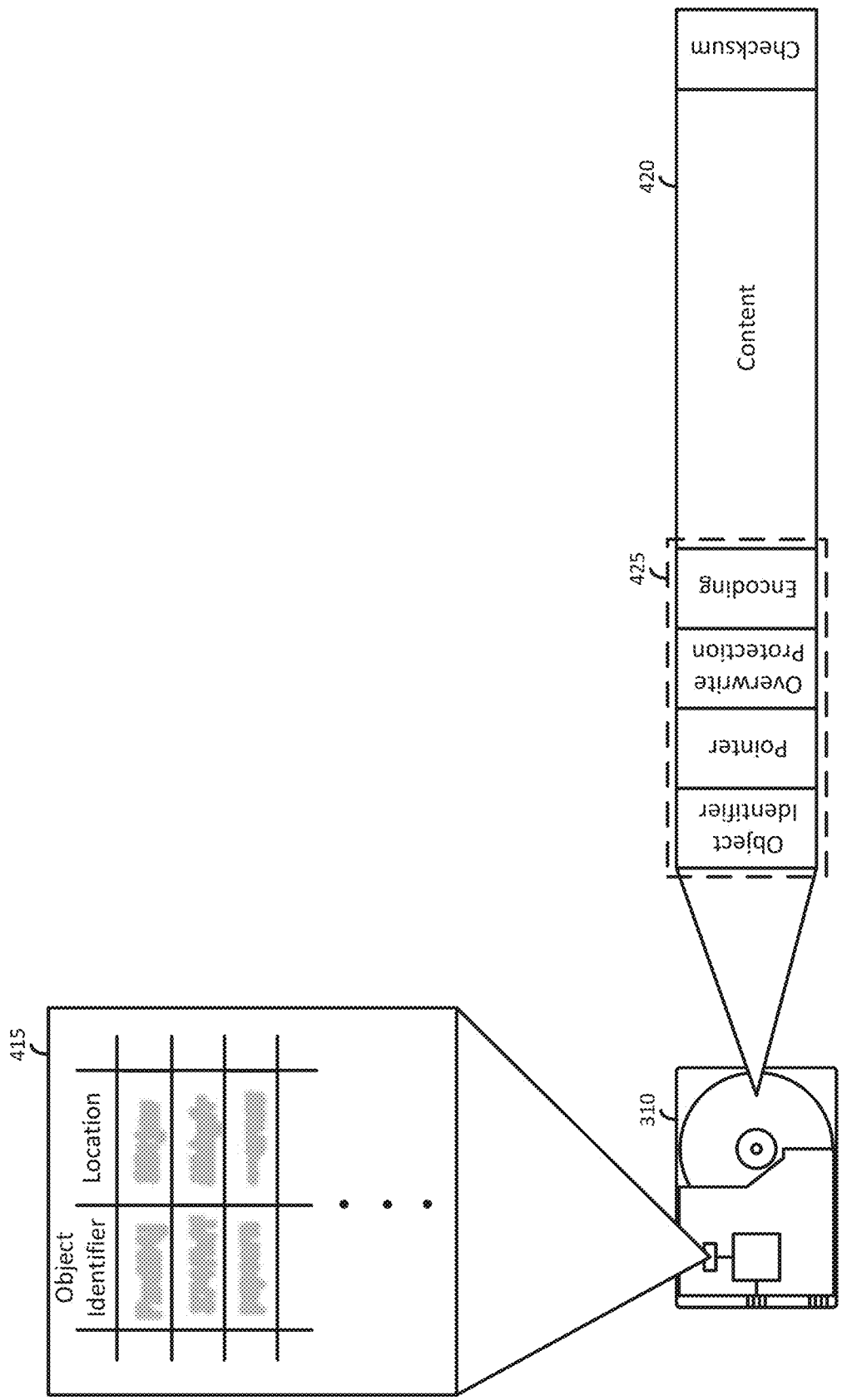
FIG. 4E illustrates a data storage arrangement according to an implementation.

FIG. 4E illustrates that any of the storage information may be stored as a header on the content stored within the storage media 110. It should be understood that any of the descriptions herein that describe storing storage information in the memory 135 or the device controller 130 are interchangeable—i.e. any of these descriptions applies equally well if the storage information is stored in memory within the device controller 130, memory 135 external to the device controller 130, or on the media with the data within the storage media 110. While FIG. 4E shows the storage information stored as a header on the content, the storage information can be stored in any location on the media with the content.

Figure 5:
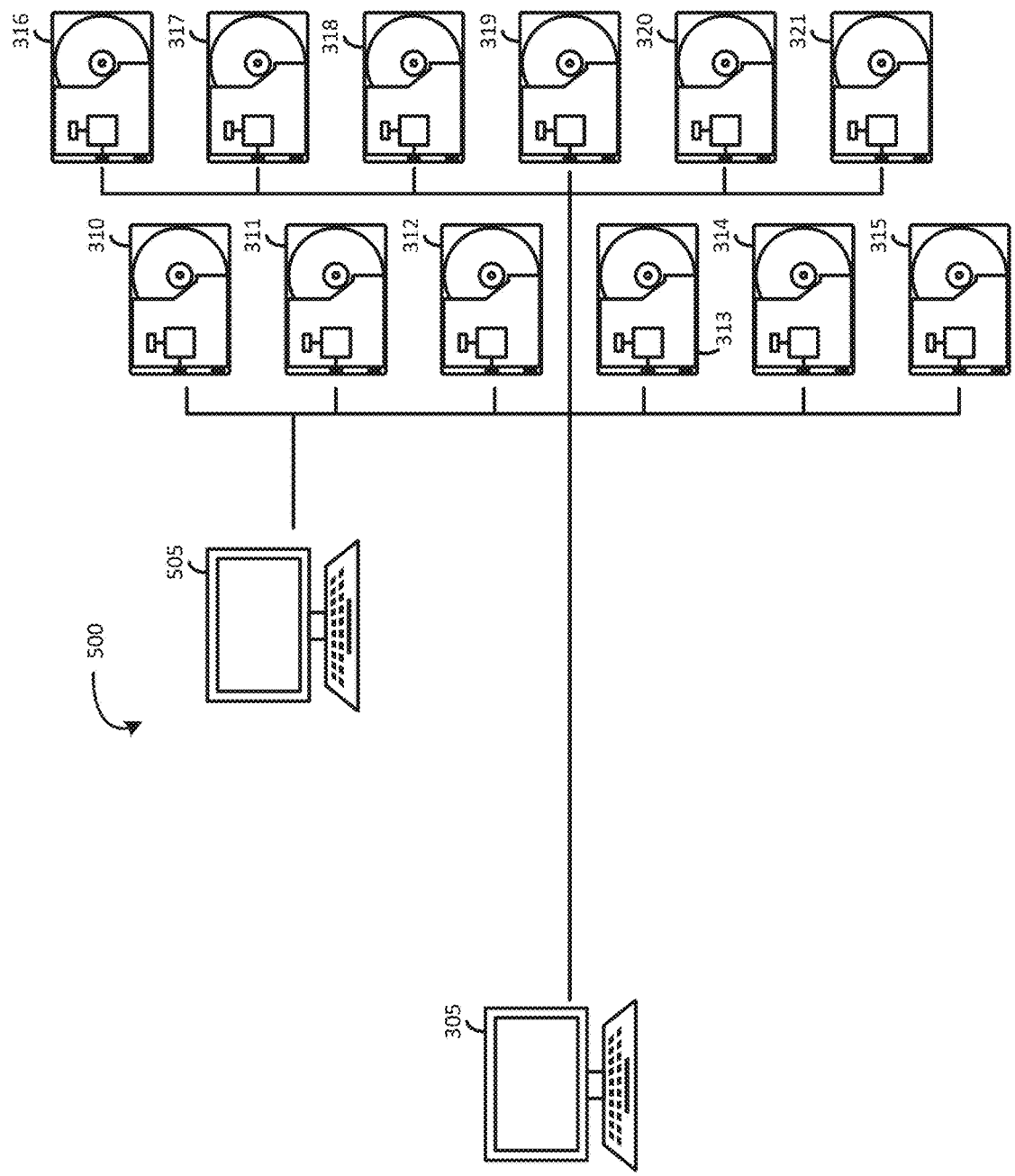
FIG. 5 illustrates a storage array according to an implementation.

FIG. 5 illustrates a storage array 500. In an implementation, multiple storage drives, such as drives 310-321 are connected together in an array to create a large pool of available storage. Such an array may be used for cloud storage support, for example. While each of the drives 310-321 in FIG. 3 is shown as a disk drive such as drive 100 shown in FIG. 1A, these drives could be any combination of drives, such as hard disk drives, solid-state drives, etc. Similarly, while 12 drives 310-321 are shown, the storage array 300 could include any number of drives. The drives 310-321 are connected to a user device 305 and a key device 505. User device 305 and key device 505 could each be any type of network device or virtual node with a network connection. Historically an array such as the storage array shown in FIG. 3 would require a storage controller in the place of user device 305 or key device 505. Since historically the device controller 130 worked externally as a response-only device, a storage controller was required to manage the reading/writing of data for the drives 310-321. In this disclosure, the device controller 130 includes capabilities beyond the historical abilities of physically managing the disk read/write process to include the ability to operate autonomously and/or interactively with other devices on the network. Therefore, each of the drives 310-321 can function independently of user device 305 or key device 505. Thus, each of drives 310-321 can independently log in to a network, or operate as any other independent network device.

Additionally, since each of drives 310-321 can be configured to communicate directly through a communications link, the connection between user device 305 and key device 505 and each of drives 310-321 (and between each of drives 310-321) is a network connection. This allows for network communication to occur between and among the devices. The device controller 130 can be configured to interact with any network.

Storage array 500 provides many benefits due to the fact that each of drives 310-321 can independently operate and interact, as outlined with reference to FIG. 3. Additionally, key device 505 provides a location to store storage information (i.e. meta-data) in a remote location, optionally a secured location, from the device controller 130, which provides many advantages.

Historically, a storage controller, such as user device 305 managed the operation of drive 310. User device 305 directed the hard disk controller in drive 310 to write content to an LBA, and drive 310 wrote the content to the PBA that mapped to the LBA identified.

On a hard drive with a magnetic disk such as storage media 110, there are many reasons that this is done. For example, the translation on the drive may be to obfuscate the defects on the device and/or various recording technologies (e.g. Shingled Magnetic Recording), or to write the content quickly.

On a hard drive with solid-state media, such as solid-state memory 145-148, this is done to prevent overuse of a particular address (wear-leveling), avoid bad blocks (media defects), and/or enable faster writing, for example.

The hard drive then keeps track of various mappings to enable reading of the correct PBA when a specific LBA is requested by the host computer system.

In an embodiment, the device controller 130 simplifies both the need for the host computer system to keep track of the physical defects, etc. and the list of block addresses for each file or object. Additionally, the device controller 130 enables the storage device to maximize the storage capacity and/or performance of the storage device based on policy.

This is implemented by providing the host computer system with alternate methodologies to maintain location information about files/objects:

When a host computer system wishes write a file/object to a storage device, the user device 305 provides the data to the drive 100. The device controller 130 stores the data where it deems best, based on the application of one or more polices. This decision may be based on (but not limited to) size of the data, existing state of the storage media, the location of the actuator arm on the media (in the case of hard disk drives), what locations have already been written, the recording technology implemented (e.g. Shingled Magnetic Recording, 3D NAND, etc.), wear leveling, alternate write activity on adjacent blocks, desired reliability level, etc.

After selecting the location the storage device may write the data to the media and subsequently or coincidentally store the location information, and/or return the location information to the requestor of the operation. This location data could additionally or alternately be written to a key device 505. If, for example, this location information is stored only in a key device 505, additional security for the data can be achieved. The location data may be represented in any number of ways (e.g. polar coordinates, cartesian coordinates, PBA, cylinder/track/sector, etc.). It may or may not include the size/length, reliability requirements, slope, and/or any additional information such as encryption key and/or encoding scheme.

It should be understood that the data recorded to the user device 305 or the key device 505 need not be limited to only the location of the data stored. The data could also include size of the content, encoding or encryption details of the content, etc.

The user device 305 or key device 505 then stores the location associated with the data that was written for future use (e.g. reading the data at a later time.)

Figure 6:
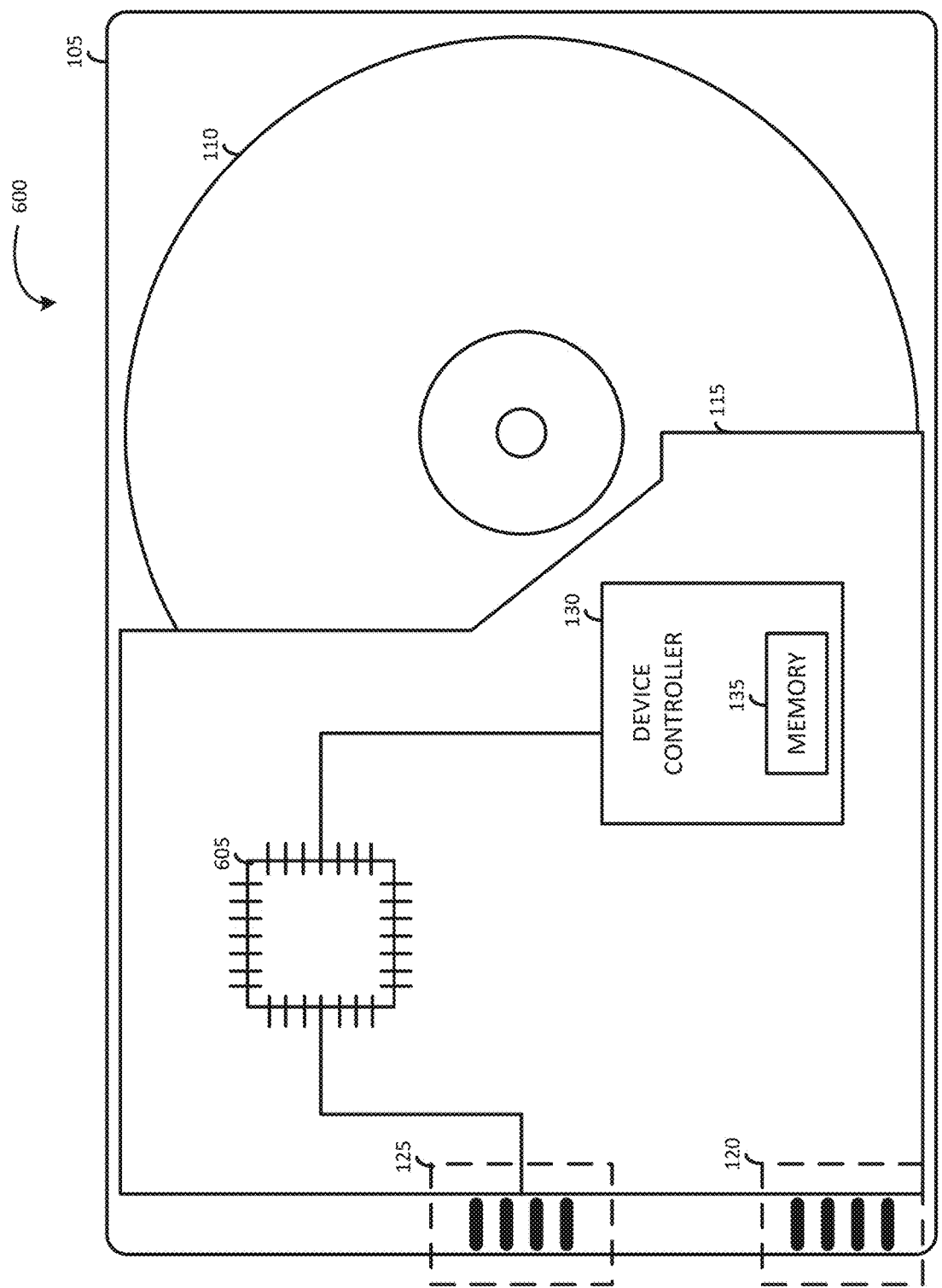
FIG. 6 illustrates a hard disk drive according to an implementation.

FIG. 6 illustrates a drive 600 according to an implementation, which is illustrated here as a drive 600 including a storage media 110 having a magnetic surface. In this example, drive 600 includes case 105, which physically supports a storage media 110, a device controller 130, a programmable logic device 605, a memory 135, interface connectors 125, and connector 120.

In an implementation, drive 600 includes storage media 110 having a magnetic surface including a plurality of zones or recording locations, a read/write transducer associated with the magnetic surface for reading and writing data in tracks in the plurality of zones, an actuator arm configured to support and position read/write transducer at a plurality of locations above the magnetic surface, and device controller 130 coupled a memory 135.

In an implementation, device controller 130 is significantly more than a traditional hard disk controller. A traditional hard disk controller is merely device that must be attached to a host controller and is only capable of responding to commands. Device controller 130 includes all the functionality of a traditional hard disk controller, with the additional ability to run code and/or applications. Device controller 130 may be in the form of a hard disk controller linked with processor chip. In an implementation, device controller 130 could be in the form of a computing system, such as that described in FIG. 12. When device controller is represented by the computing system described in FIG. 12, it should be noted that the storage system 1203 may be represented by memory 135. In other words, while there may be a storage system 1203 within device controller 130 and an additional memory 135, this is not necessary—the memory 135 may already be represented within FIG. 12 as storage system 1203. In either case, device controller is configured at least to handle the operations that a traditional hard disk controller handles, i.e. it is configured to control the actuator arm and read/write transducer to read and write data on storage media 110.

Programmable logic device 605 is inserted directly into the data and/or control path of drive 600. The programmable logic device 605 can be programmed by a user of the drive 600 for any operational need that is desired. In an embodiment, this could be used for custom encryption through hardware. Alternatively, this could be used as a regular expression engine to search for words, phrases, pictures etc. that meet certain criteria. The programmable logic device 605 could be used broadly for the entire drive 600, or could be used on a per-request basis, such that different requests to read or write content could use different programmable logic configurations. For example, a write of a text file may use programmable logic for compression, while a write of a picture may use programmable logic for facial recognition. In an implementation, the programmable logic device 605 may include a learning algorithm or artificial intelligence that can act of the signals passing through drive 100. The programmable logic device 605 may be incorporated into drive 600 as a programmable chip built into the drive 600, or as a socket assembled into the drive 600 which can later accept a programmable chip (after manufacture) for example.

While programmable logic device 605 is shown connected between interface connector 125 and device controller 130, programmable logic device 605 could also be located (and electrically and/or communicatively connected) elsewhere within the drive 600 to have the same effect. For example, programmable logic device 605 may be connected to device controller 130, and the hardware and/or software in device controller 130 will automatically route some or all of the signals through programmable logic device 605. In an implementation, programmable logic device 605 could be connected to a pre-amplifier (not shown) that is in turn connected to device controller 130.

Device controller 130 is connected to interface connector 125 (through programmable logic device 605 according to an implementation) such that device controller 130 can communicate in any manner that a network server device can communicate, for example via login (telnet, ssh, etc.), via file sharing service (NFS, SAMBA, FTP, etc.), via an Object Storage API (S3, SWIFT, etc.) or via any other protocol or service that can be run over a network. Further, device controller 130 may be loaded with any selection of firmware or software. In an implementation, an operating system hosting layer or an operating system, such as Linux, Windows, etc., is loaded on the device controller 130, allowing a user to load any software of their choosing on the device controller 130.

Figure 7A:
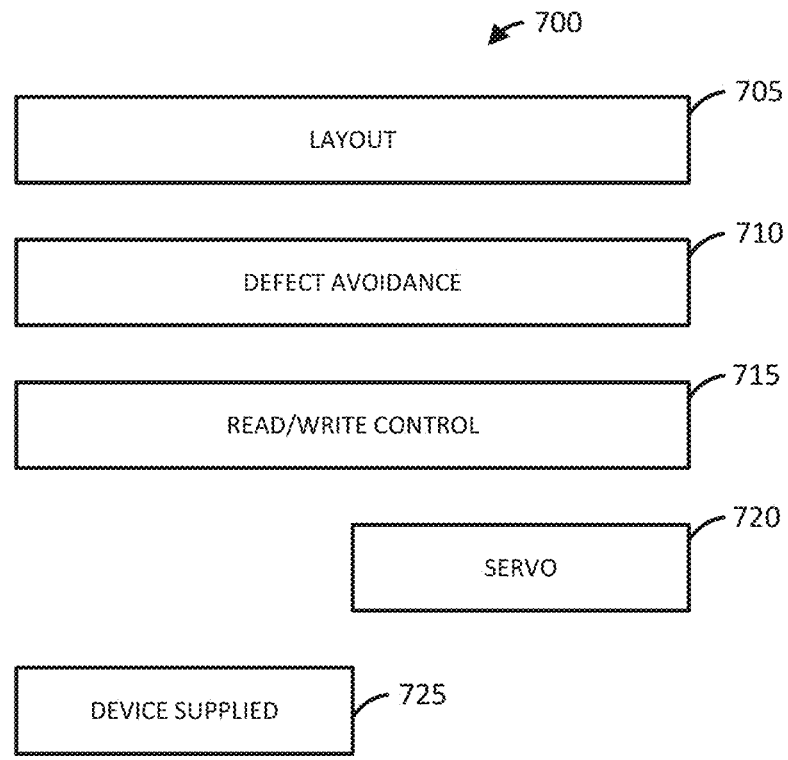
FIG. 7A illustrates a collection of libraries according to an implementation.

FIG. 7A illustrates a storage device policy according to an implementation. The device controller 130 as discussed herein allows multiple opportunities for the device firmware to adopt and implement flexible operational parameters. Historically, hard drives, both hard disk drives and solid-state drives, have included a single, immutable binary file of device firmware. This firmware, as discussed above, allowed only minimal customization by the user, and therefore was inefficient, or mis-matched to the operational environment for many users. With device controller 130 as discussed herein, this inflexibility is removed. The device controller 130 can allow selection of parameters that modify device operation, such as command timeout, read retry count, device format block size, background task controls, cache control parameters, etc. The device controller 130 allows a collection of cooperating libraries or execution elements running on one or more processors with varying capabilities.

The storage device policy can be stored (and modified or updated) on the device controller 130. Alternatively (or additionally) the storage device policy can be stored at a remote location to the device controller 130 and queried by the device controller 130 as needed to implement the storage device policy.

Collection of libraries 700 shows an example of the cooperating libraries that may be included within device controller 130. Layout library 705 can instruct the device controller 130 how to determine what layout to use for content storage. For example, layout library 705 may include algorithms that take into account the type of content to be written to the storage media 110 to determine how densely to record content onto the storage media 110. Defect avoidance library 710 can include algorithms to determine how to deal with defects within the storage media 110. As discussed above with reference to FIG. 4, this could include recording content on custom paths, or altering density of recorded content based on quality of the storage media 110 in certain tracks or sectors. Read/write control library 715 can contain instructions or algorithms directing device controller 130 on how to track write protection for recorded content, for example. Read/write control library can also contain instructions around encoding of content, including where to hold encryption keys, etc. Servo library 720 can contain entries to control the operation of the physical drive elements. Device supplied library 725 may include other elements of firmware or control relevant to the drive itself, which may be unique to a certain manufacturer or drive. The examples above are mere examples, and each of these libraries may contain any variety of static values, single functions or algorithms or collections of functions or algorithms as well as the ability to obtain parameters prior to, or at, run-time from a source on the network. Similarly, the device controller may access more than just the libraries shown in FIG. 7A, or might not access all of the displayed libraries.

In this collection of libraries, calls to and from one layer of the software made to a function in another layer of the software can be linked at the time the layer is loaded in the system. This method of linking at a late time allows for customized code or library entries to be deployed in the device controller 130. This collection of libraries 700 subsumes much of what has traditionally been device firmware on a hard disk controller.

Figure 7B:
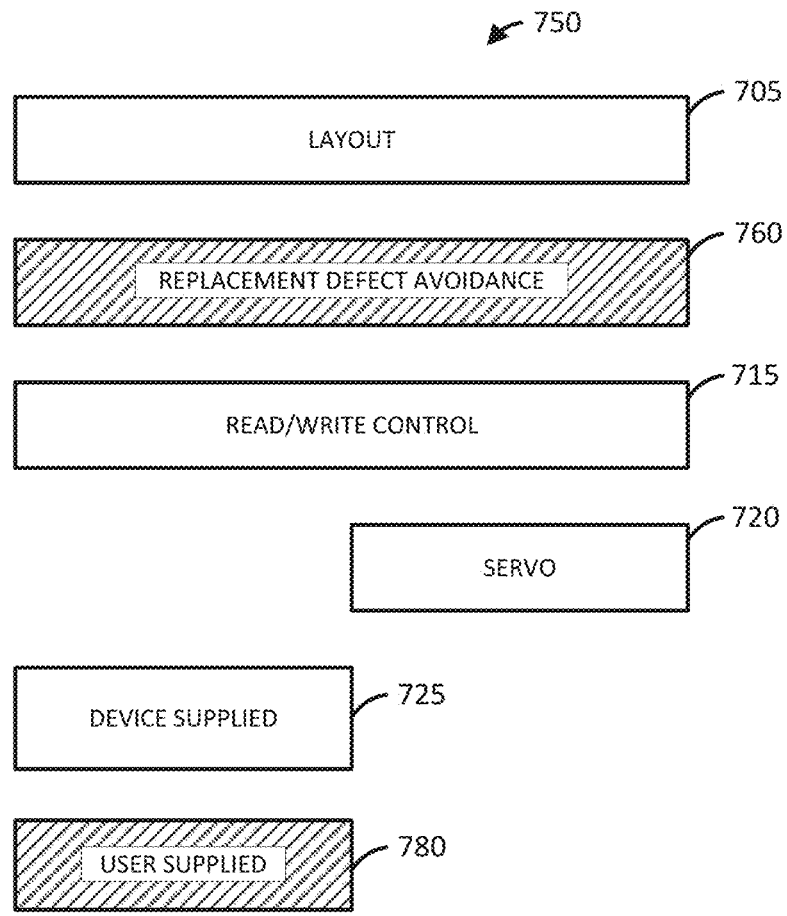
FIG. 7B illustrates a collection of libraries according to an implementation.

FIG. 7B illustrates an updated collection of libraries 750 in which the defect avoidance library 710 has been completely replaced by replacement defect avoidance library 760, and a new user supplied library 780 has been added. The approach described herein allows operational characteristics of the device controller 130, i.e. the firmware, to be defined to allow for wholesale replacement of an entire layer or layers of the cooperating libraries by the user of the device. It should be noted, that layers here can refer to anything from a static value, to a single function or algorithm, to a collection of algorithms. The user supplied libraries do not even need to be written in a source language that matches the device-supplied collection of libraries 700—they only need to satisfy the calling convention requirements of the interface software on the device controller 130.

In many cases, a user will not want to replace libraries in their entirety. In such cases, the device controller 130 can accept source code or partially compiled code that can be further compiled or interpreted by the device controller 130 and incorporated into the existing collection of libraries 700.

For example, in traditional firmware, the Read retry features of the device may be a collection of algorithmic options, in different permutations, with a different set of parameters, with some of those parameters being supplied by the user of the device.

| Retry Profile | Phase1 | Phase2 | Phase 3 | Phase 4 | ... |
|---|---|---|---|---|---|
| Fast | 1_Rev_Retry( ) | Y_Val_Avg( ) w/2 Rev | Avg_Val( ) w/10 Rev | N/A | N/A |
| Heroic | 1_Rev_Retry( ) | Avg_Val( ) w/50 Rev | Avg_Val( ) w/100 Rev | Y_Val_Avg. w/100 Rev. | "Super" recover algorithm |

In the collection of libraries 700, the same algorithms may be present in a callable form, but the user of the device can write a code snippet or script that would define the ordering of the functions tried, and the associated parameters passed to those functions, e.g.

```
Define: read_retry(timeout, max_rev) is
    call 1_Rev_Retry
        if %ret == good_read then goto done
        call Y_Val_Avg(10_rev)
        if %ret == good_read then goto done
        call Y_Val_Avg(max_rev - 10_rev)
        if %ret == good_read then goto done
        call Avg_Val (max_rev)
        If %ret == good_read then goto done
        call Super_Recover(timeout)
        If %ret == good_read then goto done
        Set global ERR_CODE = cant_read;
    :done
end read_retry;
```

Historically, the user of the device would be to select one of the choices in the table above, for example the user could choose "Fast" or "Heroic" as a MODE PAGE setting through a MODE SELECT COMMAND, a SET FEATURES setting, or equivalent. The user historically is severely restricted in the number of options available.

Utilizing the collection of libraries 700 enables the user almost unlimited control of how the device performs the "read_retry" operation. The user can make an algorithmic specification of the desired behavior. The device controller 130 allows, at the user's discretion, the ability to supply an algorithm, or collection of algorithms that extend and control the operation of the device. Another way of thinking of this as that the device controller 130 supplies a "toolkit" and it is up to the user to construct the product behavior they are after by "programming" or "scripting" the behavior themselves. The user can choose to intercept calls between the software layers and make algorithmic transformations, or they may simply replace or extend any function call with one supplied by the user to modify default behavior.

Additionally, the user supplied algorithm, "script", "bytecode", or "binary" does not necessarily need to be transferred to the device to be utilized. In an implementation, the device controller 130 would allow for the user to insert a "callback" into the collection of libraries 700 wherein the collection of libraries 700 has the ability to make a call to an algorithm or function in another location to obtain the user specified behavior or needed information. The "callback" inserted into the collection of libraries 700 could take many forms; for example, it could be as simple as a pointer to a function in memory, or as complex as a URL that is itself a function call that executes on a remote system. Further, the "callback" does not need to be written in the same language, have a similar CPU instruction set, or be on the device itself. In an implementation, a user selects some of the supplied algorithms within the collection of libraries 700, and provides an entirely new library of defect avoidance algorithms and rules.

Figure 8A:
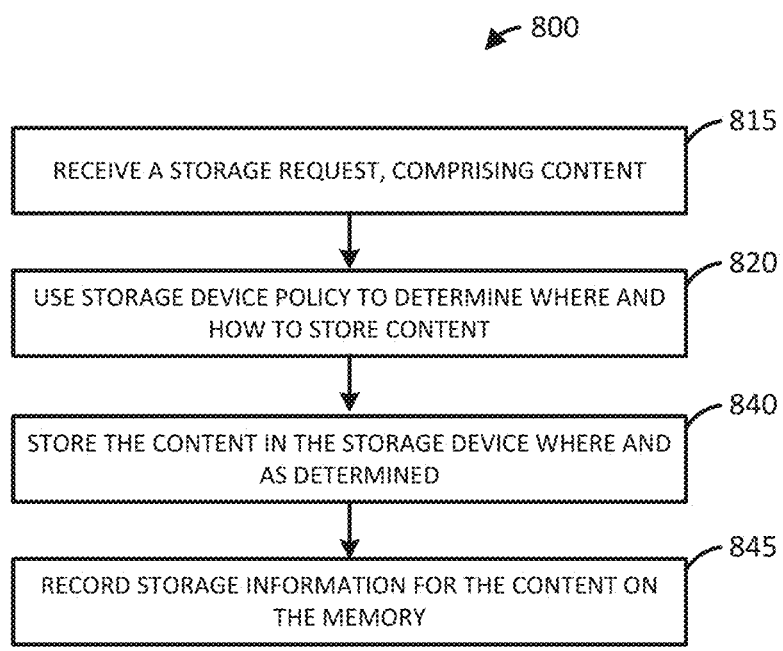
FIG. 8A illustrates a write process employed by a storage device in an implementation.

FIG. 8A illustrates a method of writing content 801 according to an implementation. A user sends a request to store content in step 815. As discussed above, a user herein is not limited to a human user, but can rather include any user or network device capable of sending a request to the device controller 130. At a minimum, this request comprises content to be stored. In an implementation, the user may include information such as an identification code, encoding information, or data protection information, for example.

In step 820, the device controller 130 uses a storage device policy, such as that described in FIGS. 7A and 7B, to determine where to store the content. This determination can relate partially to the content being stored, and partially to the storage media 110. For example, if the content contains an indication of priority level, such as information indicating that certain content is highly critical, the device controller 130, based on the storage device policy, may determine that the content should be stored on the storage media 110 at a low density, so the likelihood of data corruption will be minimal. Similarly, the storage device policy may also have an algorithm to determine how to avoid defects, and the storage device policy may instruct the device controller 130 to avoid storing highly critical content in sectors that have defects. Depending on what libraries exist in the device controller 130, and what the libraries control, many factors could be considered when deciding where and how to store the content.

In step 840, the device controller can write the content to the storage media 110 as determined in step 820. In addition to writing the actual content, in step 845 the device controller can also store a record of the write (the storage information) in memory 135 or to some non-volatile memory, such as storage media 110. In an implementation, this information can include a unique identifier for the content. This may be an object identifier supplied by the user, or created by the device controller 130, for example. The storage information may also include information relating to encoding, write protection, location, size, etc. Some or all of this information may also, or alternatively, be returned to the user when the write is complete, again based on policy in force at the time of the request.

Figure 8B:
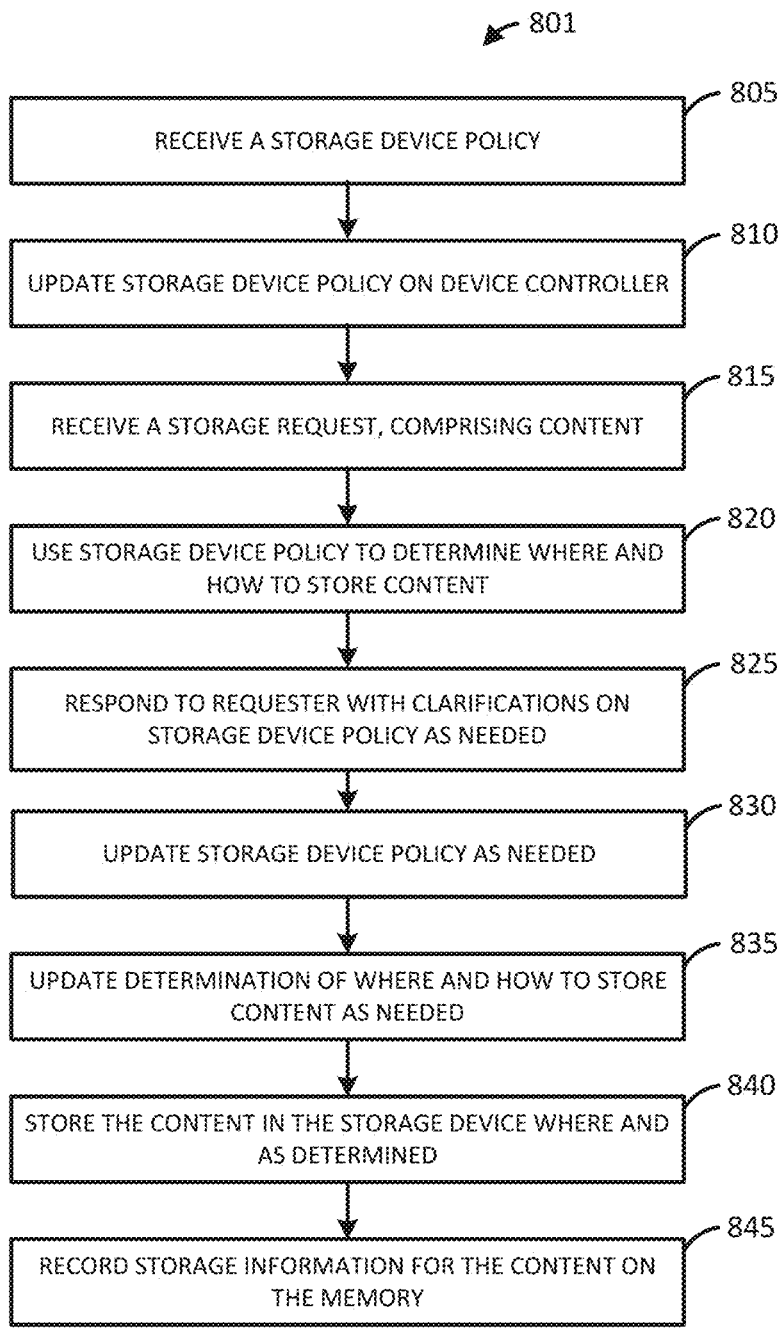
FIG. 8B illustrates a write process employed by a storage device in an implementation.

FIG. 8B illustrates a method of writing content 801 according to an implementation. In step 805, the device controller receives a storage device policy. Receiving a storage device policy here can mean receiving an update to a storage device policy already in place. The storage device policy can be part of an overall collection of libraries 700 that create the framework for device controller 130 to operate.

In step 810, these newly selected and newly supplied algorithms and rules are used to update the storage device policy on the device controller 130. In an embodiment, calls to and from one layer of the storage device policy made to a function in another layer of the storage device policy can be linked at the time the layer is loaded in the system. This method of linking at a late time allows for customized code or library entries to be deployed in the device controller 130.

A user sends a request to store content in step 815. At a minimum, this request comprises content to be stored. In an implementation, the user may include information such as an identification code, encoding information, or data protection information, for example.

In step 820, the device controller 130 uses the storage device policy to determine where to store the content. This determination can relate partially to the content being stored, and partially to the storage media 110. For example, if the content contains an indication of priority level, such as information indicating that certain content is highly critical, the device controller 130, based on the storage device policy, may determine that the content should be stored on the storage media 110 at a low density, so the likelihood of data corruption will be minimal. Similarly, the storage device policy may also have an algorithm to determine how to avoid defects, and the storage device policy may instruct the device controller 130 to avoid storing highly critical content in sectors that have defects. Depending on what libraries exist in the device controller 130, and what the libraries control, many factors could be considered when deciding where and how to store the content.

In an implementation, in step 825, the device controller 130 will not have enough information in the storage device policy, and the device controller may reach back out to a network machine, or to a policy server, to request further information. For instance, the collection of libraries 700 may include a rule or algorithm that controls how to store certain content, but the user may not have selected that rule or algorithm or a replacement rule or algorithm. The device controller 130 may send a request to the user prompting the selection of a rule or algorithm or to set values for the generic rule or algorithm.

When the user supplies the needed information, the device controller 130 can update the storage device policy in step 830, as above in step 810, or can use the information temporally to complete the operation. When the storage device has the needed information, the device controller 130 can also update the determination of where and how to store the content in step 835

In step 840, the device controller can write the content to the storage media 110 as determined in step 820 and/or step 835. In addition to writing the actual content, in step 845 the device controller can also store a record of the write (the storage information) in memory 135 or to some non-volatile memory, such as storage media 110. In an implementation, this information can include a unique identifier for the content. This may be an object identifier supplied by the user, or created by the device controller 130. The record may also include information relating to encoding, write protection, location, size, etc. Some or all of this information may also be returned to the user when the write is complete, again based on policy in force at the time of the request.

Figure 8C:
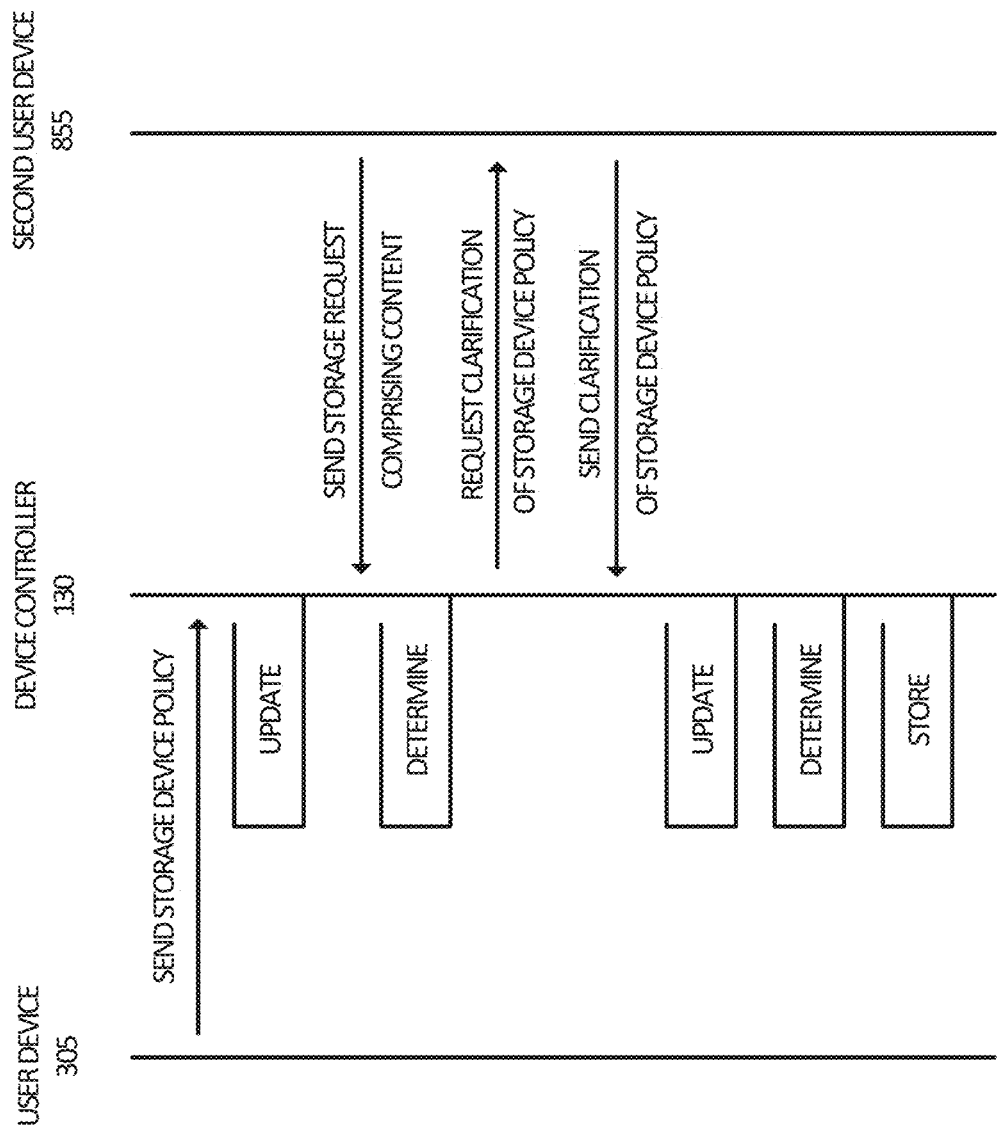
FIG. 8C illustrates an operational sequence in an implementation of a policy-based write.

FIG. 8C illustrates an operational sequence of a policy-based write according to an implementation. The device controller receives a storage device policy from a user device 305. Receiving a storage device policy here can mean receiving an update to a storage device policy already in place. The storage device policy can be part of an overall collection of libraries 700 that create the framework for device controller 130 to operate. In an implementation, a user device 305 provides values for some of the supplied algorithms within the collection of libraries 700, and provides some entirely new rules.

These algorithms and rules are used to update the storage device policy on the device controller 130. In an embodiment, calls to and from one layer of the storage device policy made to a function in another layer of the storage device policy can be linked at the time the layer is loaded in the system and can remain in force permanently or temporally. This method of linking at a late time allows for customized code or library entries to be deployed in the device controller 130.

A second user device 855 then sends a request to the device controller 130 to store content. At a minimum, this request comprises content to be stored. In an implementation, the device controller 130 needs little information beyond the content itself, but the user may still include information such as an identification code, encoding information, of data protection information, for example. This request can come from the second user device 855 for many reasons. For example, both user device 305 and second user device 855 may be part of the same network, and both user devices may have access to the device controller 130 through the network connection. Alternatively, user device 305 may have been disconnected from the network and replaced by the second user device 855 at some point in time after the storage device policy update and before the storage request. In another implementation, the drive 100 may have been disconnected from the network at some point after the storage device policy was updated. Drive 100 may have been connected to a new network that does not include user device 305. Since the customized storage device policy resides on the device controller 130, the storage device policy can move with the drive 100 to the new location.

The device controller 130 uses the storage device policy to determine where and how to store the content from the second user device 855. This determination can relate partially to the content being stored, and partially to the storage media 110. For example, if the content contains an indication of priority level, such as information indicating that certain content is highly critical, the device controller 130, based on the storage device policy, may determine that the content should be stored on the storage media 110 at a low density, so the likelihood of data corruption will be minimal. Similarly, the storage device policy may also have an algorithm to determine how to avoid defects, and the storage device policy may instruct the device controller 130 to avoid storing highly critical content in sectors that have defects. Depending on what libraries exist in the device controller 130, and what the libraries control, many factors could be considered when deciding where and how to store the content.

In an implementation, the device controller 130 may not have enough information in the storage device policy, and the device controller may reach back out to the requesting network machine or another network resource to request further information. For instance, the collection of libraries 700 may include a rule or algorithm that controls how to store certain content, but the user may not have selected that rule or algorithm or a replacement rule or algorithm. The device controller 130 may send a request to the user prompting the selection of a rule or algorithm or to set values for the generic rule or algorithm.

When the requested information is supplied, the device controller 130 can update the storage device policy. In an implementation, some of the storage device policy defined by the user device 305 may have write protections, such that the second user device 855 does not have authority to change the storage device policy. After the storage device policy is updated, the device controller 130 can also update the determination of where and how to store the content.

The device controller 130 can write the content to the storage media as determined above. In addition to writing the actual content, the device controller 130 can also store a record of the write (the storage information) in memory 135. In an implementation, this information can include a unique identifier for the content. This may be an object identifier supplied by the second user device 855, or created by the device controller 130. The record may also include information relating to encoding, write protection, location, size, etc. Some or all of this information may also be returned to the second user device 855 when the write is complete.

Figure 8D:
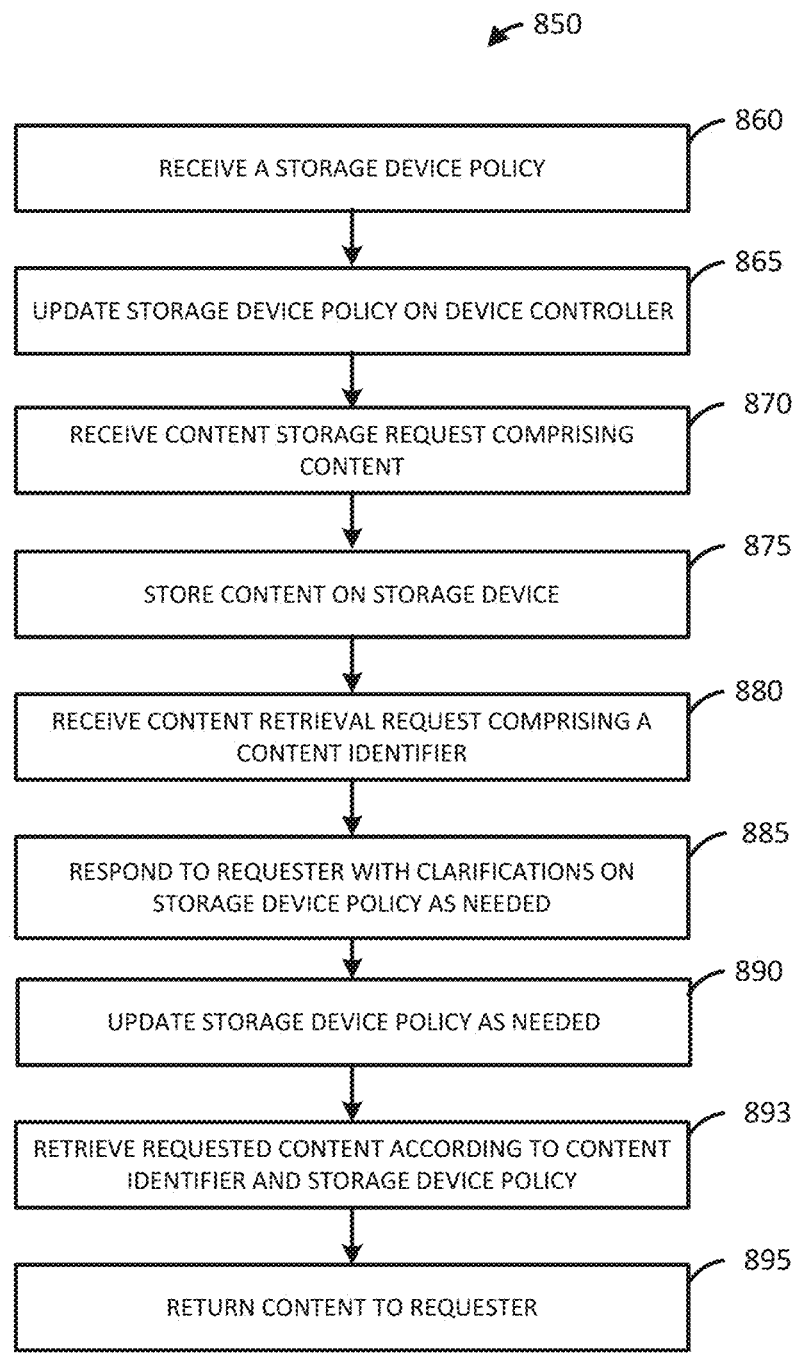
FIG. 8D illustrates a read process employed by a storage device in an implementation.

FIG. 8D illustrates a method of reading content 850 according to an implementation. In step 860, the device controller receives a storage device policy. Receiving a storage device policy here can mean receiving an update to a storage device policy already in place. The storage device policy can be part of an overall collection of libraries 700 that create the framework for device controller 130 to operate. In an implementation, a user selects some of the supplied algorithms within the collection of libraries 700, and provides an entirely new library of defect avoidance algorithms and rules.

In step 865, these newly selected and newly supplied algorithms and rules are used to update the storage device policy on the device controller 130. In an embodiment, calls to and from one layer of the storage device policy made to a function in another layer of the storage device policy can be linked at the time the layer is loaded in the system. This method of linking at a late time allows for customized code or library entries to be deployed in the device controller 130.

A user sends a request to store content in step 870. At a minimum, this request comprises content to be stored. In an implementation, the user may include information such as an identification code, encoding information, of data protection information, or other storage information, for example. The device controller 130 uses the storage device policy to determine where and how to store the content. This determination can relate partially to the content being stored, and partially to the storage media 110. For example, if the content contains an indication of priority level, such as information indicating that certain content is highly critical, the device controller 130, based on the storage device policy, may determine that the content should be stored on the storage media 110 at a low density, so the likelihood of data corruption will be minimal. Similarly, the storage device policy may also have an algorithm to determine how to avoid defects, and the storage device policy may instruct the device controller 130 to avoid storing highly critical content in sectors that have defects. Depending on what libraries exist in the device controller 130, and what the libraries control, many factors could be considered when deciding where and how to store the content.

In step 875, the device controller can write the content to the storage media as determined. In addition to writing the actual content the device controller 130 can also store a record of the write (the storage information) in memory 135. In an implementation, this information can include a unique identifier for the content. This may be an object identifier supplied by the user, or created by the device controller 130. The record may also include information relating to encoding, write protection, location, size, etc. Some or all of this information may also be returned to the user when the write is complete. In an implementation, some or all of the storage information is provided by the user as part of the request to store content in step 870.

In step 880, the device controller 130 receives a content request. This request includes at least a content or object identifier to identify the requested content. This request may further include some or all of the information provided to the user after the write of the content was completed in step 875.

In an implementation, in step 885, the device controller 130 will not have enough information in the storage device policy to complete the content retrieval, and the device controller may reach back out to the requesting network machine to request further information. For instance, the collection of libraries 700 may include a rule or algorithm that controls how to protect certain content, but the user may not have selected that rule or algorithm or a replacement rule or algorithm. The device controller 130 may send a request to the user prompting the user to select a rule or algorithm or to set values for the generic rule or algorithm.

When the user supplies the requested information, the device controller 130 can update the storage device policy in step 890, as above in step 865.

In step 893, the device controller 130 retrieves the requested content according to the storage device policy that has been defined. In step 895, the device controller 130 sends the content back to the user.

Figure 8E:
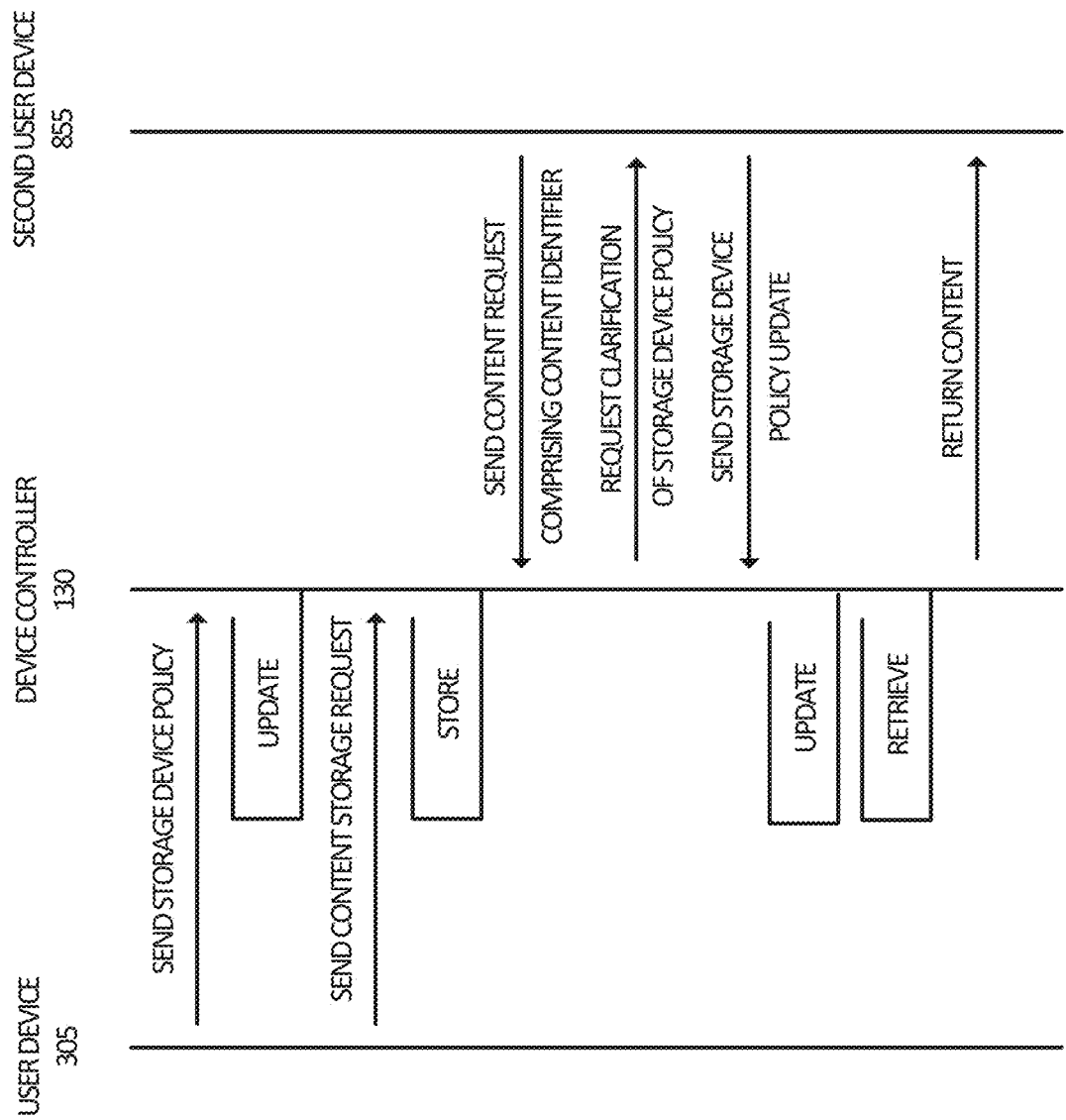
FIG. 8E illustrates an operational sequence in an implementation of a policy-based read.

FIG. 8E illustrates an operational sequence of a policy-based write according to an implementation. The device controller receives a storage device policy from a user device 305. Receiving a storage device policy here can mean receiving an update to a storage device policy already in place. The storage device policy can be part of an overall collection of libraries 700 that create the framework for device controller 130 to operate. In an implementation, a user device 305 provides values for some of the supplied algorithms within the collection of libraries 700, and provides some entirely new rules.

These algorithms and rules are used to update the storage device policy on the device controller 130. In an embodiment, calls to and from one layer of the storage device policy made to a function in another layer of the storage device policy can be linked at the time the layer is loaded in the system. This method of linking at a late time allows for customized code or library entries to be deployed in the device controller 130.

The user device 305 then sends a request to the device controller 130 to store content. At a minimum, this request comprises content to be stored. In an implementation, the device controller 130 needs little information beyond the content itself, but the user may still include information such as an identification code, encoding information, of data protection information, for example.

The device controller 130 uses the storage device policy to determine where and how to store the content from the second user device 855. This determination can relate partially to the content being stored, and partially to the storage media 110. For example, if the content contains an indication of priority level, such as information indicating that certain content is highly critical, the device controller 130, based on the storage device policy, may determine that the content should be stored on the storage media 110 at a low density, so the likelihood of data corruption will be minimal. Similarly, the storage device policy may also have an algorithm to determine how to avoid defects, and the storage device policy may instruct the device controller 130 to avoid storing highly critical content in sectors that have defects. Depending on what libraries exist in the device controller 130, and what the libraries control, many factors could be considered when deciding where to store the content.

The device controller 130 writes the content to the storage media as determined above. In addition to writing the actual content, the device controller 130 can also store a record of the write (the storage information) in memory 135. In an implementation, this information can include a unique identifier for the content. This may be an object identifier supplied by the second user device 855, or created by the device controller 130. The record may also include information relating to encoding, write protection, location, size, etc. Some or all of this information may also be returned to the second user device 855 when the write is complete.

At some point, a second user device 855 sends a content request to device controller 130. This request includes at least a content or object identifier to identify the requested content. This request may further include some or all of the information provided to the user device 305 after the write of the content was completed.

This request can come from the second user device 855 for many reasons. For example, both user device 305 and second user device 855 may be part of the same network, and both user devices may have access to the device controller 130 through the network connection. Alternatively, user device 305 may have been disconnected from the network and replaced by the second user device 855 at some point in time after the storage device policy update and before the storage request. In another implementation, the drive 100 may have been disconnected from the network at some point after the storage device policy was updated. Drive 100 may have been connected to a new network that does not include user device 305. Since the customized storage device policy resides on the device controller 130, the storage device policy can move with the drive 100 to the new location.

In an implementation, the device controller 130 will not have enough information in the storage device policy, and the device controller may reach back out to the requesting network machine to request further information. For instance, the collection of libraries 700 may include a rule or algorithm that controls how to store certain content, but the user may not have selected that rule or algorithm or a replacement rule or algorithm. The device controller 130 may send a request to the second user device 855 prompting the second user device 855 to select a rule or algorithm or to set values for the generic rule or algorithm. The storage device policy set by the user device 305 may include protections that restrict later updates to the storage device policy. The second user device 855 may therefore have limited or no option to change the storage device policy.

When the second user device 855 supplies the requested information, the device controller 130 can update the storage device policy. The device controller 130 retrieves the requested content according to the storage device policy that has been defined. The device controller 130 then sends the content back to the second user device 855.

Figure 9A:
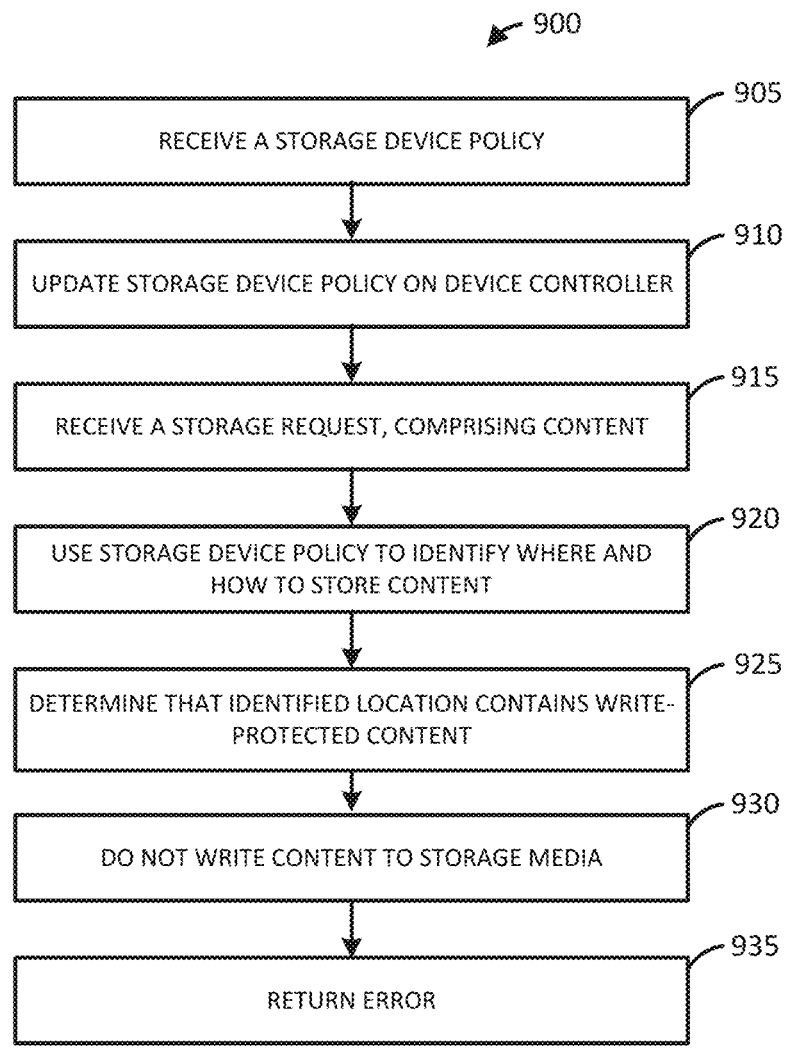
FIG. 9A illustrates a write process employed by a storage device in an implementation.

FIG. 9A illustrates a method of writing content 900 according to an implementation. In step 905, the device controller receives a storage device policy. Receiving a storage device policy here can mean receiving an update to a storage device policy already in place. The storage device policy can be part of an overall collection of libraries 700 that create the framework for device controller 130 to operate. In an implementation, a user selects some of the supplied algorithms within the collection of libraries 700.

In step 910, these newly selected and newly supplied algorithms and rules are used to update the storage device policy on the device controller 130. In an embodiment, calls to and from one layer of the storage device policy made to a function in another layer of the storage device policy can be linked at the time the layer is loaded in the system. This method of linking at a late time allows for customized code or library entries to be deployed in the device controller 130.

A user sends a request to store content in step 915. At a minimum, this request comprises content to be stored. In an implementation, the user may include information such as an identification code, encoding information, of data protection information, for example.

In step 920, the device controller 130 uses the storage device policy to determine where and how to store the content. This determination can relate partially to the content being stored, and partially to the storage media 110. For example, if the content contains an indication of priority level, such as information indicating that certain content is highly critical, the device controller 130, based on the storage device policy, may determine that the content should be stored on the storage media 110 at a low density, so the likelihood of data corruption will be minimal. Similarly, the storage device policy may also have an algorithm to determine how to avoid defects, and the storage device policy may instruct the device controller 130 to avoid storing highly critical content in sectors that have defects. Depending on what libraries exist in the device controller 130, and what the libraries control, many factors could be considered when deciding where and how to store the content.

In an implementation, in step 925, the device controller 130 will determine that the location identified by the device controller 130 to write to content already has content that is write protected. Note that this information (write protection) is stored within the drive 100, and consequently will not lose write protection status is drive 100 is removed from connection with user device 305, for example.

In step 930, the device controller 130 does not complete the write operation, and in step 935, an error is returned to user device 305. In an embodiment, rather than return an error, the device controller 130 could identify another location that is not write protected, and complete the write operation.

According to an implementation, drive 100 may be configured so that all data stored thereon is write protected, in which case the device controller 130 may simply write content sequentially through the drive, maintaining a pointer to the next location to write content. In this case, when the pointer reaches the end of the available space on the storage media 110, any additional requests to write will be returned as errors. Alternatively, this behavior may be limited to a portion of the storage media 110, or may be decided on a per-block or per object basis, for example.

Figure 9B:
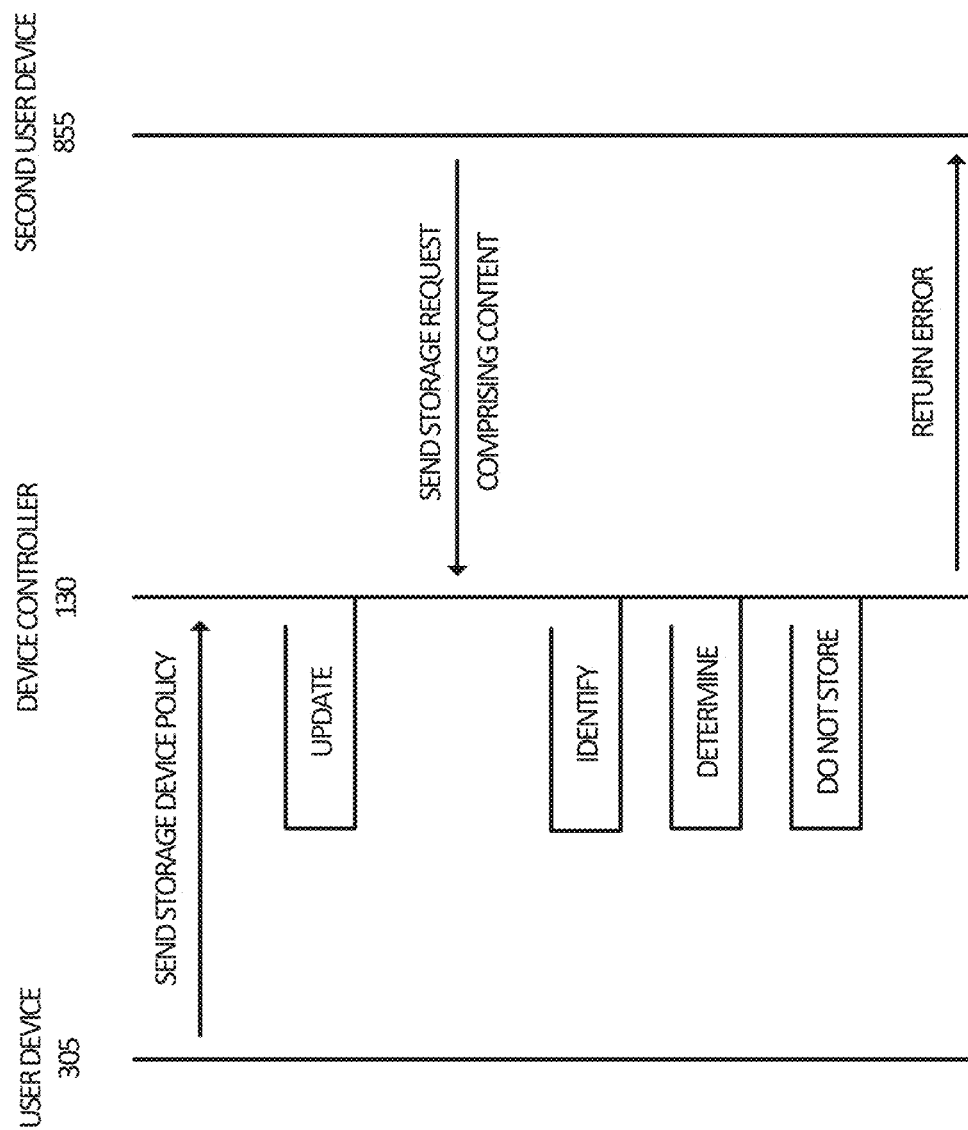
FIG. 9B illustrates an operational sequence in an implementation of a policy-based write.

FIG. 9B illustrates an operational sequence of a policy-based write according to an implementation. The device controller receives a storage device policy from a user device 305. Receiving a storage device policy here can mean receiving an update to a storage device policy already in place. The storage device policy can be part of an overall collection of libraries 700 that create the framework for device controller 130 to operate. In an implementation, a user device 305 provides values for some of the supplied algorithms within the collection of libraries 700, and provides some entirely new rules.

These algorithms and rules are used to update the storage device policy on the device controller 130. In an embodiment, calls to and from one layer of the storage device policy made to a function in another layer of the storage device policy can be linked at the time the layer is loaded in the system. This method of linking at a late time allows for customized code or library entries to be deployed in the device controller 130.

A second user device 855 then sends a request to the device controller 130 to store content. At a minimum, this request comprises content to be stored. In an implementation, the device controller 130 needs little information beyond the content itself, but the user may still include information such as an identification code, encoding information, or data protection information, for example. This request can come from the second user device 855 for many reasons. For example, both user device 305 and second user device 855 may be part of the same network, and both user devices may have access to the device controller 130 through the network connection. Alternatively, user device 305 may have been disconnected from the network and replaced by the second user device 855 at some point in time after the storage device policy update and before the storage request. In another implementation, the drive 100 may have been disconnected from the network at some point after the storage device policy was updated. Drive 100 may have been connected to a new network that does not include user device 305. Since the customized storage device policy resides on the device controller 130, the storage device policy can move with the drive 100 to the new location.

The device controller 130 uses the storage device policy to identify where and how to store the content from the second user device 855. This determination can relate partially to the content being stored, and partially to the storage media 110. For example, if the content contains an indication of priority level, such as information indicating that certain content is highly critical, the device controller 130, based on the storage device policy, may determine that the content should be stored on the storage media 110 at a low density, so the likelihood of data corruption will be minimal. Similarly, the storage device policy may also have an algorithm to determine how to avoid defects, and the storage device policy may instruct the device controller 130 to avoid storing highly critical content in sectors that have defects. Depending on what libraries exist in the device controller 130, and what the libraries control, many factors could be considered when deciding where and how to store the content.

In an implementation, the device controller 130 will determine that the location identified by the device controller 130 already contains content that is write protected. Consequently, the device controller 130 will not store that content. A notification of an error will then be returned to the second user device 855. According to an implementation, drive 100 may be configured so that all data stored thereon is write protected, in which case the device controller 130 may simply write content sequentially through the drive, maintaining a pointer to the next location to write content. In this case, when the pointer reaches the end of the available space on the storage media 110, any additional requests to write will be returned as errors. Alternatively, this behavior may be limited to a portion of the storage media 110, or may be decided on a per-block or per object basis, for example.

Figure 9C:
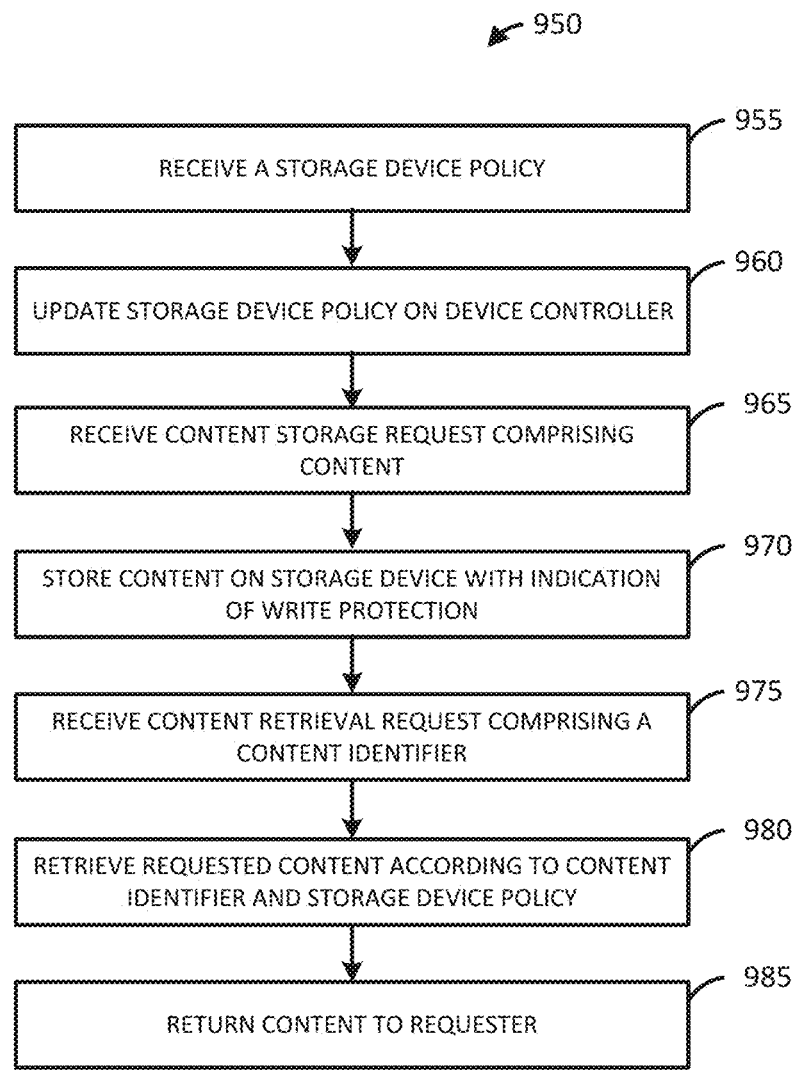
FIG. 9C illustrates a read process employed by a storage device in an implementation.

FIG. 9C illustrates a method of reading content 950 according to an implementation. In step 955, the device controller receives a storage device policy. Receiving a storage device policy here can mean receiving an update to a storage device policy already in place. The storage device policy can be part of an overall collection of libraries 700 that create the framework for device controller 130 to operate. In an implementation, a user selects some of the supplied algorithms within the collection of libraries 700, and provides an entirely new library of defect avoidance algorithms and rules.

In step 960, these newly selected and newly supplied algorithms and rules are used to update the storage device policy on the device controller 130. In an embodiment, calls to and from one layer of the storage device policy made to a function in another layer of the storage device policy can be linked at the time the layer is loaded in the system. This method of linking at a late time allows for customized code or library entries to be deployed in the device controller 130.

A user sends a request to store content in step 965. At a minimum, this request comprises content to be stored. In an implementation, the user may include information such as an identification code, encoding information, of data protection information, for example. The device controller 130 uses the storage device policy to determine where and how to store the content. In an implementation, this determination includes a determination that the content should be stored as write-protected (or write-once) such that is will not be deleted later or overwritten. This determination could be based on an entire drive 100 being designated as a write-protected drive, or as certain sectors or tracks or regions being pre-designated as write protected. Alternatively, an individual object may be designated as write-protected as it is stored.

Any determination of where or how to store the content can relate partially to the content being stored, and partially to the storage media 110. For example, if the content contains an indication of priority level, such as information indicating that certain content is highly critical, the device controller 130, based on the storage device policy, may determine that the content should be stored on the storage media 110 at a low density, so the likelihood of data corruption will be minimal. Similarly, the storage device policy may also have an algorithm to determine how to avoid defects, and the storage device policy may instruct the device controller 130 to avoid storing highly critical content in sectors that have defects. Depending on what libraries exist in the device controller 130, and what the libraries control, many factors could be considered when deciding where and how to store the content.

In step 970, the device controller can write the content to the storage media as determined, including an indication of write protection. In addition to writing the actual content the device controller 130 can also store a record of the write (the storage information) in memory 135 or to some non-volatile media, such as storage media 110. In an implementation, this information can include a unique identifier for the content. This may be an object identifier supplied by the user, or created by the device controller 130. The record may also include information relating to encoding, write protection, location, size, etc. Some or all of this information may also be returned to the user when the write is complete.

In step 975, the device controller 130 receives a content request. This request includes at least a content or object identifier to identify the requested content. This request may further include some or all of the information provided to the user after the write of the content was completed in step 970.

In step 980, the device controller 130 retrieves the requested content according to the storage device policy that has been defined. In step 985, the device controller 130 sends the content back to the user.

Figure 9D:
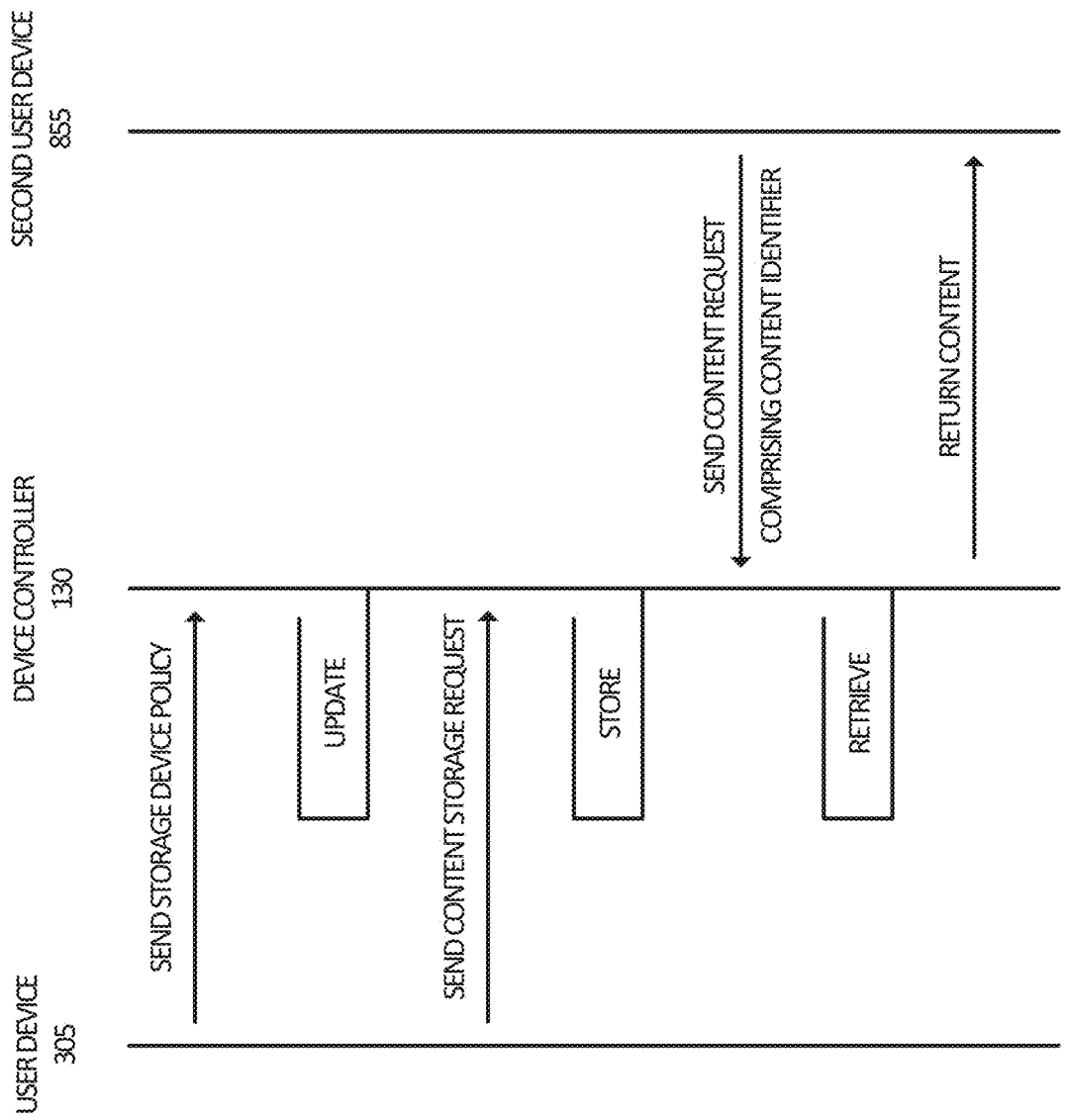
FIG. 9D illustrates an operational sequence in an implementation of a policy-based read.

FIG. 9D illustrates an operational sequence of a policy-based write according to an implementation. The device controller receives a storage device policy from a user device 305. Receiving a storage device policy here can mean receiving an update to a storage device policy already in place. The storage device policy can be part of an overall collection of libraries 700 that create the framework for device controller 130 to operate. In an implementation, a user device 305 provides values for some of the supplied algorithms within the collection of libraries 700, and provides some entirely new rules.

These algorithms and rules are used to update the storage device policy on the device controller 130. In an embodiment, calls to and from one layer of the storage device policy made to a function in another layer of the storage device policy can be linked at the time the layer is loaded in the system. This method of linking at a late time allows for customized code or library entries to be deployed in the device controller 130.

The user device 305 then sends a request to the device controller 130 to store content. At a minimum, this request comprises content to be stored. In an implementation, the device controller 130 needs little information beyond the content itself, but the user may still include information such as an identification code, encoding information, of data protection information, for example. In an implementation, the content is sent with a specific instruction that the content be written and write protected so that the content cannot be overwritten in the future.

The device controller 130 uses the storage device policy to determine where and how to store the content from the user device 305. In an implementation, this determination includes a determination that the content will be written and write protected. This determination may be due to the specific instruction of write protection for the content delivered, or due to an overarching policy that all content (or some portion of content) stored on drive 100 should be written and write protected.

The device controller 130 writes the content to the storage media as determined above. In addition to writing the actual content, the device controller 130 can also store a record of the write (the storage information) in memory 135, including an indication of write protection. In an implementation, this information can include a unique identifier for the content. This may be an object identifier supplied by the user device 305, or created by the device controller 130. The record may also include information relating to encoding, write protection, location, size, etc. Some or all of this information may also be returned to the second user device 855 when the write is complete.

At some point, a second user device 855 sends a content request to device controller 130. This request includes at least a content or object identifier to identify the requested content. This request may further include some or all of the information provided to the user device 305 after the write of the content was completed.

This request can come from the second user device 855 for many reasons. For example, both user device 305 and second user device 855 may be part of the same network, and both user devices may have access to the device controller 130 through the network connection. Alternatively, user device 305 may have been disconnected from the network and replaced by the second user device 855 at some point in time after the storage device policy update and before the storage request. In another implementation, the drive 100 may have been disconnected from the network at some point after the storage device policy was updated. Drive 100 may have been connected to a new network that does not include user device 305. Since the customized storage device policy resides on the device controller 130, the storage device policy can move with the drive 100 to the new location.

The device controller 130 retrieves the requested content according to the storage device policy that has been defined. The device controller 130 then sends the content back to the second user device 855.

Figure 10A:
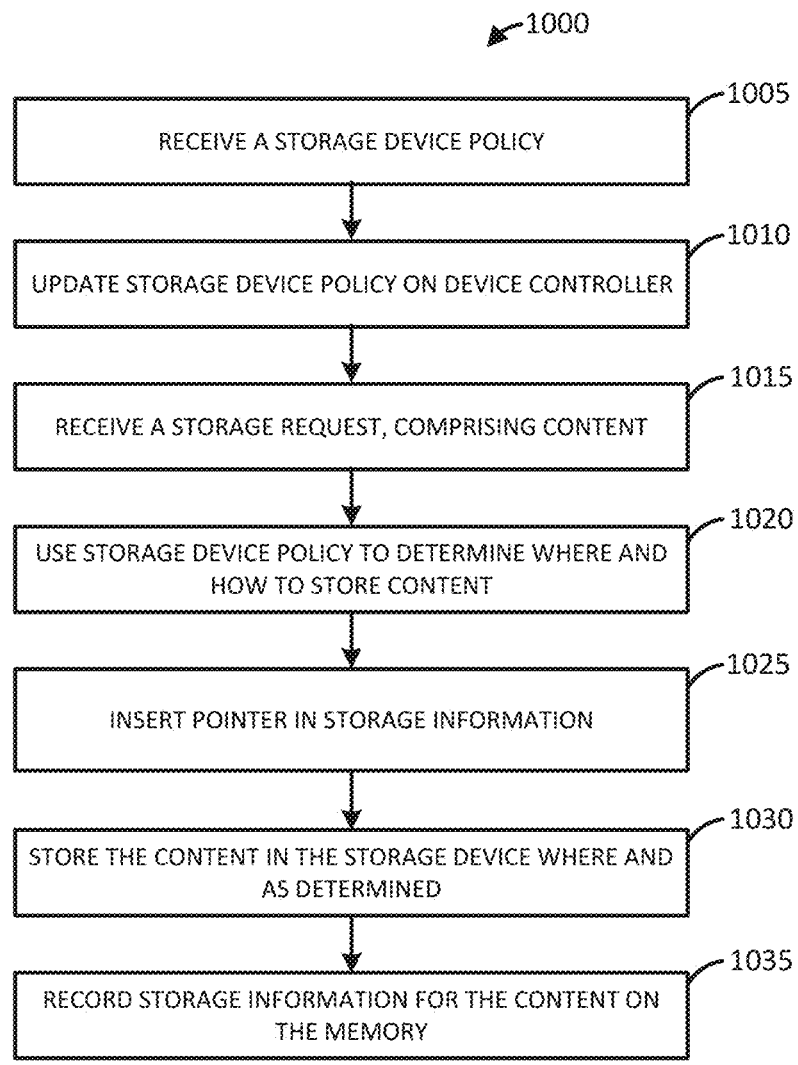
FIG. 10A illustrates a write process employed by a storage device in an implementation.

FIG. 10A illustrates a method of writing content 1000 according to an implementation. In step 1005, the device controller receives a storage device policy. Receiving a storage device policy here can mean receiving an update to a storage device policy already in place. The storage device policy can be part of an overall collection of libraries 700 that create the framework for device controller 130 to operate. In an implementation, a user selects some of the supplied algorithms within the collection of libraries 700.

In step 1010, these newly selected and newly supplied algorithms and rules are used to update the storage device policy on the device controller 130. In an embodiment, calls to and from one layer of the storage device policy made to a function in another layer of the storage device policy can be linked at the time the layer is loaded in the system. This method of linking at a late time allows for customized code or library entries to be deployed in the device controller 130.

A user sends a request to store content in step 1015. At a minimum, this request comprises content to be stored. In an implementation, the user may include information such as an identification code, encoding information, of data protection information, for example.

In step 1020, the device controller 130 uses the storage device policy to determine where and how to store the content. This determination can relate partially to the content being stored, and partially to the storage media 110. For example, if the content contains an indication of priority level, such as information indicating that certain content is highly critical, the device controller 130, based on the storage device policy, may determine that the content should be stored on the storage media 110 at a low density, so the likelihood of data corruption will be minimal. Similarly, the storage device policy may also have an algorithm to determine how to avoid defects, and the storage device policy may instruct the device controller 130 to avoid storing highly critical content in sectors that have defects. Depending on what libraries exist in the device controller 130, and what the libraries control, many factors could be considered when deciding where and how to store the content.

In an implementation, this determination will include a determination of where storage information will be stored. For example, the storage information may be stored on the memory 135 on drive 100. Alternately, the storage information may be returned to the user device 305 that requested the content storage. The storage information could also be sent to a separate device, such as key device 505 for storage. In an implementation, when the storage information is sent to key device 505, the device controller 130 may determine not to store the information on memory 135. In step 1025, an indication of the location of the storage information is stored in memory 135, or inserted into a header 625 stored with the content on storage media 110.

In step 1030, the device controller 130 completes the write operation, and in step 1035, storage information for the content is written to memory 135. The storage information written to memory may not include all of the storage information. For example, the storage information written to memory 135 may include only an object identifier and a pointer to the storage location of the rest of the storage information. In this way, if the drive 100 is physically removed from its initial location, or for some reason key device 505 is removed, the content stored on storage media 110 can remain secure.

According to an implementation, drive 100 may be configured so that all data stored thereon has storage information stored in key device 505, thus requiring drive 100 to communicate with the key device 505 prior to retrieving any content. According to an implementation, content objects within drive 100 may be treated individually, such that certain objects have associated storage information stored on a key device 505, while others may not.

Figure 10B:
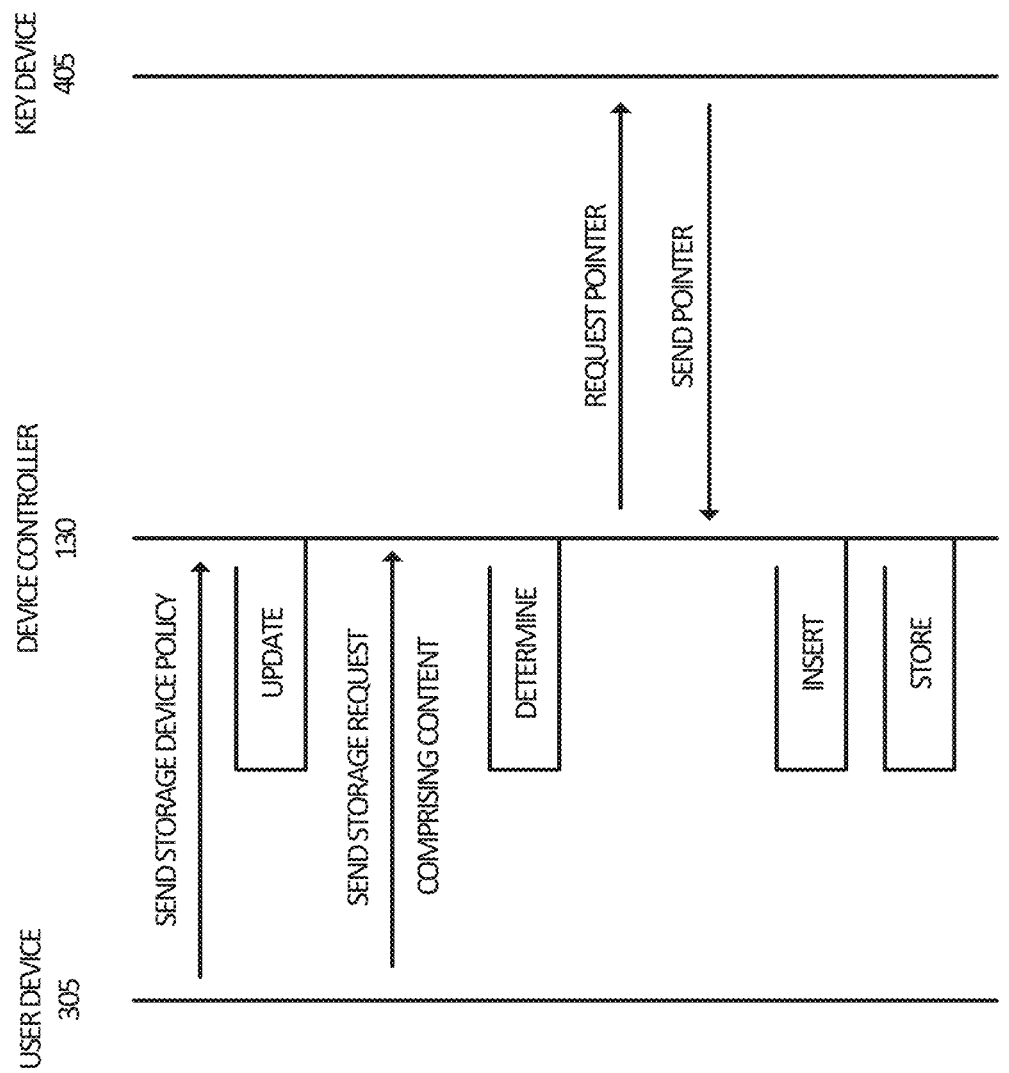
FIG. 10B illustrates an operational sequence in an implementation of a policy-based write.

FIG. 10B illustrates an operational sequence of a policy-based write according to an implementation. The device controller receives a storage device policy from a user device 305. Receiving a storage device policy here can mean receiving an update to a storage device policy already in place. The storage device policy can be part of an overall collection of libraries 700 that create the framework for device controller 130 to operate. In an implementation, a user device 305 provides values for some of the supplied algorithms within the collection of libraries 700, and provides some entirely new rules.

These algorithms and rules are used to update the storage device policy on the device controller 130. In an embodiment, calls to and from one layer of the storage device policy made to a function in another layer of the storage device policy can be linked at the time the layer is loaded in the system. This method of linking at a late time allows for customized code or library entries to be deployed in the device controller 130.

A user device 305 then sends a request to the device controller 130 to store content. At a minimum, this request comprises content to be stored. In an implementation, the device controller 130 needs little information beyond the content itself, but the user may still include information such as an identification code, encoding information, of data protection information, for example.

The device controller 130 uses the storage device policy to identify where and how to store the content from the user device 305. This determination may include a determination on where to store storage information. This may be due to an overarching policy that all content stored on the drive 100 should store storage information on key device 505, for example. In an implementation, prior to recording the content to the storage media 110, the device controller reaches out to the key device 505 to request a location pointer for the storage information for the content to be stored (i.e. some indication of where the storage information will be stored). This pointer is returned to the device controller, which inserts the pointer into a header 625 that is inserted into the content to be stored. The content, with the header 625 is then recorded on storage media 110. In an implementation, the location pointer for indicating the location of the storage information (which in turn indicates how to read the stored content) can be provided by the device controller 130 to the key device 505. The key device 505 can then store the storage information at the location indicated by the location pointer.

Figure 10C:
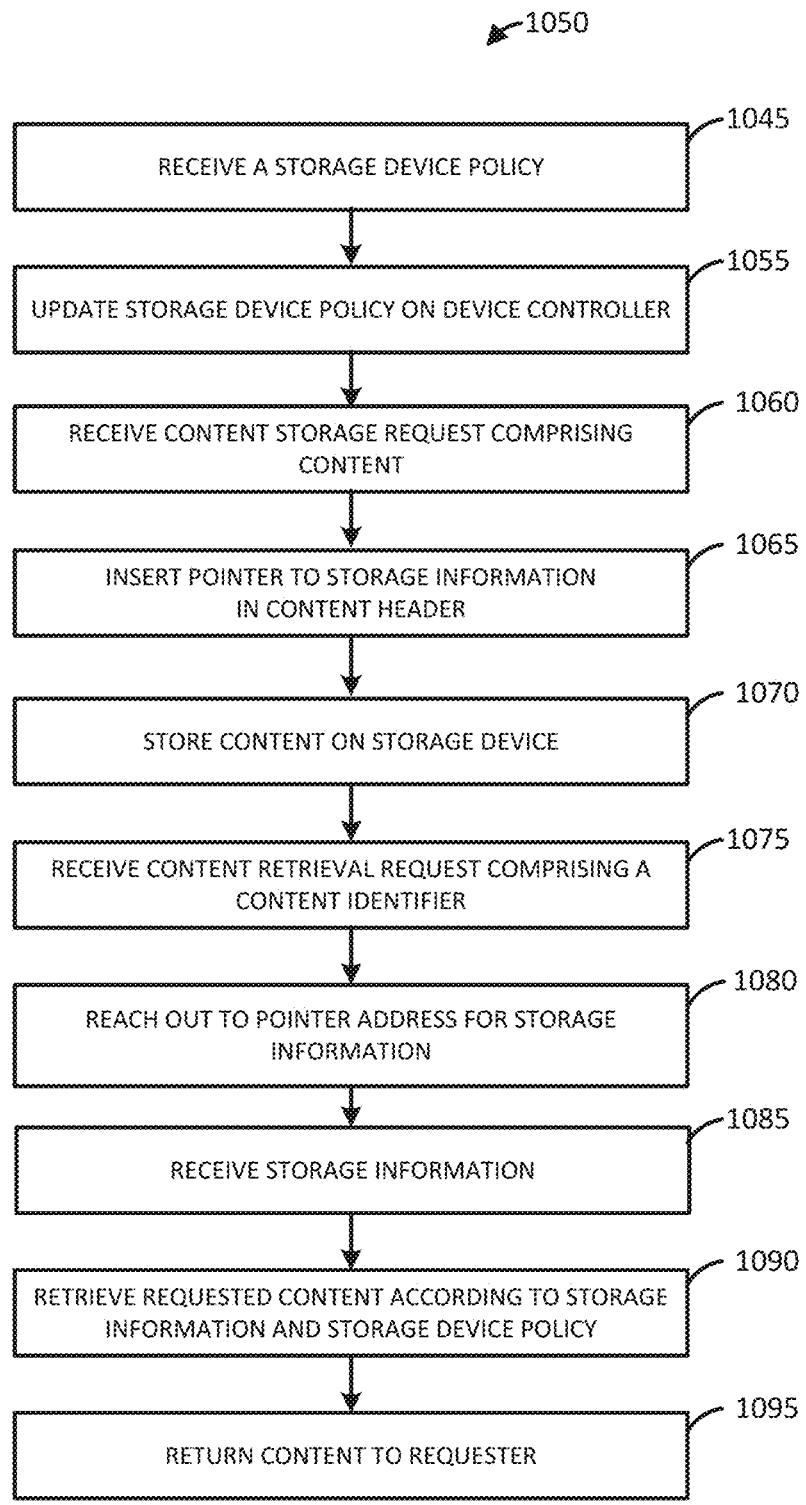
FIG. 10C illustrates a read process employed by a storage device in an implementation.

FIG. 10C illustrates a method of reading content 1050 according to an implementation. In step 1045, the device controller receives a storage device policy. Receiving a storage device policy here can mean receiving an update to a storage device policy already in place. The storage device policy can be part of an overall collection of libraries 700 that create the framework for device controller 130 to operate. In an implementation, a user selects some of the supplied algorithms within the collection of libraries 700.

In step 1055, these newly selected and newly supplied algorithms and rules are used to update the storage device policy on the device controller 130. In an embodiment, calls to and from one layer of the storage device policy made to a function in another layer of the storage device policy can be linked at the time the layer is loaded in the system. This method of linking at a late time allows for customized code or library entries to be deployed in the device controller 130.

A user sends a request to store content in step 1060. At a minimum, this request comprises content to be stored. In an implementation, the user may include information such as an identification code, encoding information, of data protection information, for example. The device controller 130 uses the storage device policy to determine where and how to store the content. In an implementation, this determination includes a determination that the storage information for the content should be stored as externally to the drive 100 such that is may have additional security. This determination could be based on an entire drive 100 being designated to do so, or as certain sectors or tracks or regions being pre-designated as such. Alternatively, an individual object may be designated to be so treated. According to an implementation, this designation can be flexible, and change over time.

Any determination of where or how to store the content can relate partially to the content being stored, and partially to the storage media 110. For example, if the content contains an indication of priority level, such as information indicating that certain content is highly critical, the device controller 130, based on the storage device policy, may determine that the content should be stored on the storage media 110 at a low density, so the likelihood of data corruption will be minimal. Similarly, the storage device policy may also have an algorithm to determine how to avoid defects, and the storage device policy may instruct the device controller 130 to avoid storing highly critical content in sectors that have defects. Depending on what libraries exist in the device controller 130, and what the libraries control, many factors could be considered when deciding where and how to store the content.

In step 1065, The device controller 130 can insert an indication of where the storage information will be stored for the content to be stored.

In step 1070, the device controller can write the content to the storage media as determined, including an indication of a location of storage information. In addition to writing the actual content the device controller 130 can also store a record of the write (the storage information) in memory 135. In an implementation, the storage information stored on memory 135 is only a subset of the storage memory, for instance only including an object identifier, and a location of the full storage information.

In step 1075, the device controller 130 receives a content request. This request includes at least a content or object identifier to identify the requested content. This request may further include some or all of the information provided to the user after the write of the content was completed in step 1070.

In step 1080, the device controller 130 reaches out to the location identified by the pointer (for example the key device 505) for the storage information to determine the storage information. This storage information may include track, sector, or region information indicating where the content is stored on storage media 110. In an implementation, the storage information may include detailed location information, such as polar or cartesian coordinates, slope, derivative or other information identifying the specific location of the content storage. In an implementation, the content could be irretrievable without this specific storage information. In step 1085, the device controller 130 receives the storage information from the key device 505.

In step 1090, the device controller 130 uses the storage information received from key device 505, together with the storage device policy to retrieve the requested information. In step 1095, the device controller 130 returns the content to the requester.

Figure 10D:
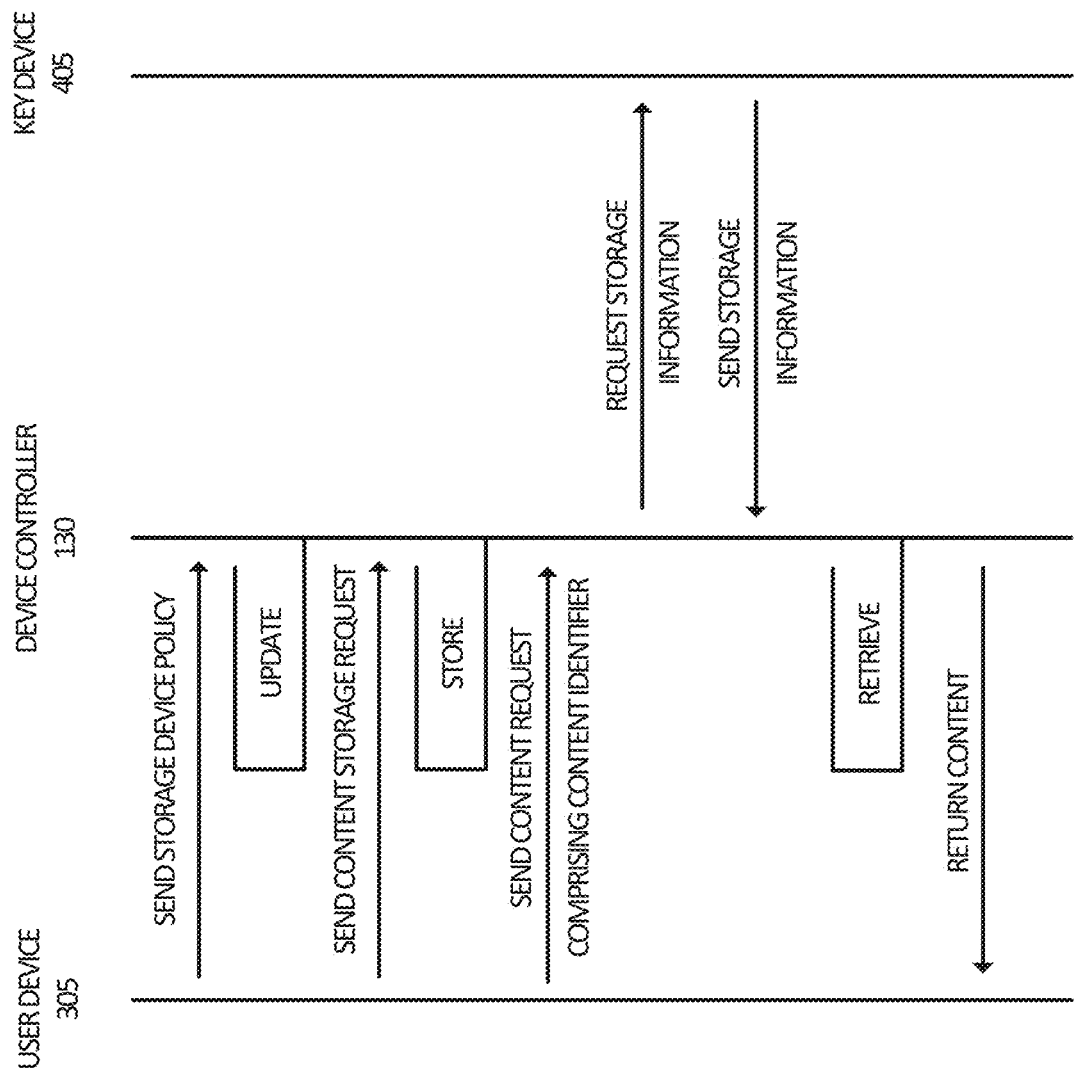
FIG. 10D illustrates an operational sequence in an implementation of a policy-based read.

FIG. 10D illustrates an operational sequence of a policy-based write according to an implementation. The device controller receives a storage device policy from a user device 305. Receiving a storage device policy here can mean receiving an update to a storage device policy already in place. The storage device policy can be part of an overall collection of libraries 700 that create the framework for device controller 130 to operate. In an implementation, a user device 305 provides values for some of the supplied algorithms within the collection of libraries 700, and provides some entirely new rules.

These algorithms and rules are used to update the storage device policy on the device controller 130. In an embodiment, calls to and from one layer of the storage device policy made to a function in another layer of the storage device policy can be linked at the time the layer is loaded in the system. This method of linking at a late time allows for customized code or library entries to be deployed in the device controller 130.

A user device 305 then sends a request to the device controller 130 to store content. At a minimum, this request comprises content to be stored. In an implementation, the device controller 130 needs little information beyond the content itself, but the user may still include information such as an identification code, encoding information, of data protection information, for example.

The device controller 130 uses the storage device policy to identify where and how to store the content from the user device 305. This determination may include a determination on where to store storage information. This may be due to an overarching policy that all content stored on the drive 100 should store storage information on key device 505, for example. In an implementation, prior to recording the content to the storage media 110, the device controller 130 determines that storage device information will be stored on a key device 505. This location is inserted into a header 625 that is inserted into the content to be stored. The content, with the header 625 is then recorded on storage media 110.

At some point, user device 305 sends a content request to device controller 130. This request includes at least a content or object identifier to identify the requested content. This request may further include some or all of the information provided to the user device 305 after the write of the content was completed.

The device controller reaches out to the key device 505 to retrieve the storage information. It should be understood that the key device 505 may include security protections to ensure that only authorized users can retrieve the storage information. The key device 505 sends the storage information back to the device controller 130, and the device controller uses the storage information, together with the storage device policy, to retrieve the requested content. The device controller 130 then sends the content back to the second user device 855.

Figure 11A:
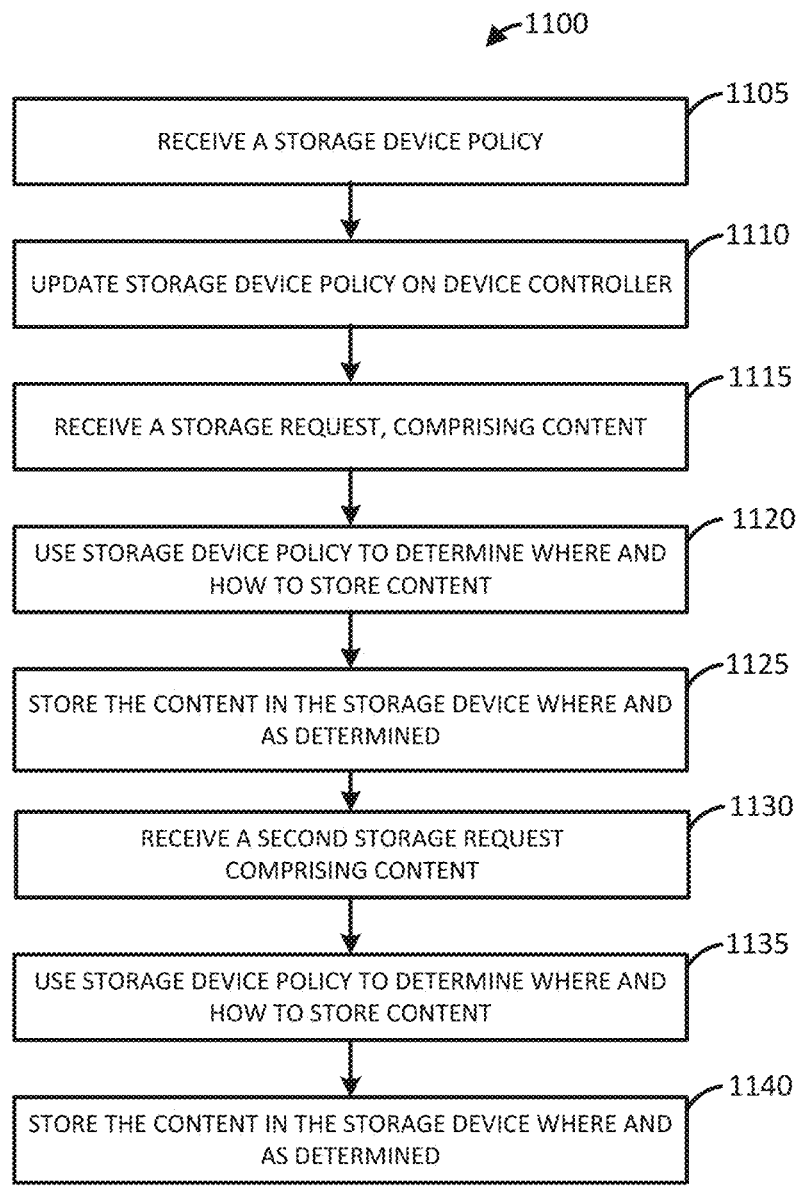
FIG. 11A illustrates a write process employed by a storage device in an implementation.

FIG. 11A illustrates a method of writing content 1100 according to an implementation. In step 1105, the device controller receives a storage device policy. Receiving a storage device policy here can mean receiving an update to a storage device policy already in place. The storage device policy can be part of an overall collection of libraries 700 that create the framework for device controller 130 to operate. In an implementation, a user selects some of the supplied algorithms within the collection of libraries 700, and provides an entirely new library of defect avoidance algorithms and rules.

In step 1110, these newly selected and newly supplied algorithms and rules are used to update the storage device policy on the device controller 130. In an embodiment, calls to and from one layer of the storage device policy made to a function in another layer of the storage device policy can be linked at the time the layer is loaded in the system. This method of linking at a late time allows for customized code or library entries to be deployed in the device controller 130. The storage device policy may be defined such that each object that is stored on storage media 110 may be handled independently, i.e. with its own distinct storage policy. In this way, one object can be stored with user preferences for increased data security, while another may be stored utilizing preferences for increased storage space, and still another may emphasize redundancy.

A user sends a request to store content in step 1115. At a minimum, this request comprises content to be stored. In an implementation, the user may include information such as an identification code, encoding information, of data protection information, for example.

In step 1120, the device controller 130 uses the storage device policy to determine where and how to store the content. This determination can relate partially to the content being stored, and partially to the storage media 110. For example, if the content contains an indication of priority level, such as information indicating that certain content is highly critical, the device controller 130, based on the storage device policy, may determine that the content should be stored on the storage media 110 at a low density, so the likelihood of data corruption will be minimal. Similarly, the storage device policy may also have an algorithm to determine how to avoid defects, and the storage device policy may instruct the device controller 130 to avoid storing highly critical content in sectors that have defects. Depending on what libraries exist in the device controller 130, and what the libraries control, many factors could be considered when deciding where and how to store the content.

In step 1125, the device controller 130 will store the content how and where determined. The device controller 130 may further store storage information, indicate write-protection, etc.

In step 1130, the device controller 130 receives a second request to store content, comprising a content to be stored. The device controller, in step 1135 uses the storage device policy to determine where and how to store the content. In an implementation, the device controller 130 determines to store the content in this second request differently that the device controller 130 stored the first content. In step 1140, the hard drive stores the second content differently than it stored the first content, FIG. 11B illustrates an operational sequence of a policy-based write according to an implementation. The device controller receives a storage device policy from a user device 305. Receiving a storage device policy here can mean receiving an update to a storage device policy already in place. The storage device policy can be part of an overall collection of libraries 700 that create the framework for device controller 130 to operate. In an implementation, a user device 305 provides values for some of the supplied algorithms within the collection of libraries 700, and provides some entirely new rules.

These algorithms and rules are used to update the storage device policy on the device controller 130. In an embodiment, calls to and from one layer of the storage device policy made to a function in another layer of the storage device policy can be linked at the time the layer is loaded in the system. This method of linking at a late time allows for customized code or library entries to be deployed in the device controller 130.

A second user device 855 then sends a request to the device controller 130 to store content. At a minimum, this request comprises content to be stored. In an implementation, the device controller 130 needs little information beyond the content itself, but the user may still include information such as an identification code, encoding information, of data protection information, for example. This request can come from the second user device 855 for many reasons. For example, both user device 305 and second user device 855 may be part of the same network, and both user devices may have access to the device controller 130 through the network connection. Alternatively, user device 305 may have been disconnected from the network and replaced by the second user device 855 at some point in time after the storage device policy update and before the storage request. In another implementation, the drive 100 may have been disconnected from the network at some point after the storage device policy was updated. Drive 100 may have been connected to a new network that does not include user device 305. Since the customized storage device policy resides on the device controller 130, the storage device policy can move with the drive 100 to the new location.

The device controller 130 uses the storage device policy to identify where and how to store the content from the second user device 855. This determination can relate partially to the content being stored, and partially to the storage media 110. For example, if the content contains an indication of priority level, such as information indicating that certain content is highly critical, the device controller 130, based on the storage device policy, may determine that the content should be stored on the storage media 110 at a low density, so the likelihood of data corruption will be minimal. Similarly, the storage device policy may also have an algorithm to determine how to avoid defects, and the storage device policy may instruct the device controller 130 to avoid storing highly critical content in sectors that have defects. Depending on what libraries exist in the device controller 130, and what the libraries control, many factors could be considered when deciding where and how to store the content.

The device controller 130 will store the content in accordance with the determination of where and how to store the content.

At some point, the device controller 130 receives a second request to store content, comprising at least the content to be stored. This request may come from a device distinct from the second user device 855, such as the user device 305. It should be noted that the second request may also be received from an entirely distinct device that did not participate in defining the storage device policy. As above, the device controller 130 determines where and how to store the second content. According to the storage device policy, this may be distinct from how the first content was stored. The storage device policy may define that certain sectors or regions be stored in certain ways, or may leave flexibility that each individual object can be stored with its own policy determinations. The device controller 130 can then store the content according to the storage device policy.

Figure 11C:
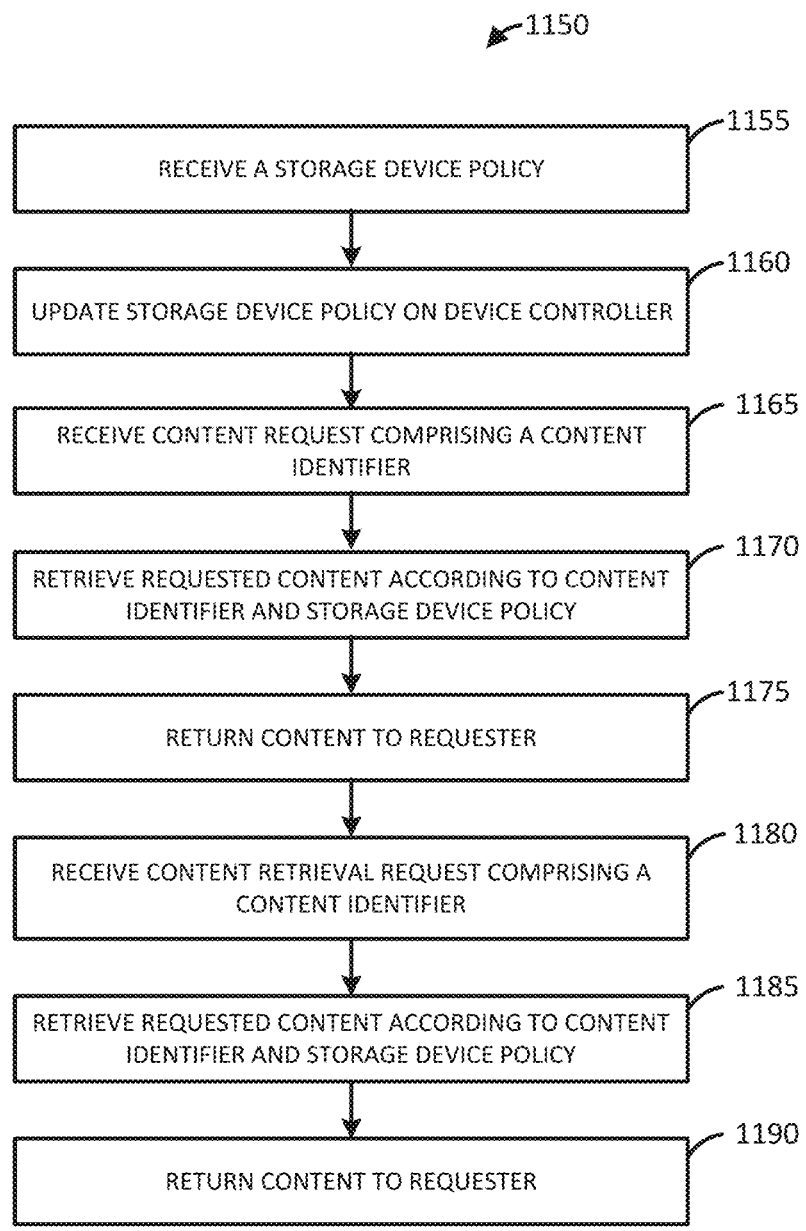
FIG. 11C illustrates a read process employed by a storage device in an implementation.

FIG. 11C illustrates a method of reading content 1150 according to an implementation. In step 1155, the device controller receives a storage device policy. Receiving a storage device policy here can mean receiving an update to a storage device policy already in place. The storage device policy can be part of an overall collection of libraries 700 that create the framework for device controller 130 to operate. In an implementation, a user selects some of the supplied algorithms within the collection of libraries 700, and provides an entirely new library of defect avoidance algorithms and rules.

In step 1160, these newly selected and newly supplied algorithms and rules are used to update the storage device policy on the device controller 130. In an embodiment, calls to and from one layer of the storage device policy made to a function in another layer of the storage device policy can be linked at the time the layer is loaded in the system. This method of linking at a late time allows for customized code or library entries to be deployed in the device controller 130.

A user sends a request to retrieve content in step 1165. At a minimum, this request comprises a content identifier. In step 1170, the device controller can retrieve the requested content in accordance with the storage device policy, and in step 1175, the device controller returns the content to the user.

In step 1180, the device controller 130 receives a second request for content, comprising at least a second content identifier. In an implementation, this second content may be stored according to different storage device policy rules that was the first content. Consequently, the device controller 130 will use different storage device policy rules to retrieve the second content in step 1185. The device controller 130 can then return the content to the requesting user in step 1190. It is of note that the content stored on storage media 110 can be independently written according to storage device policy at any level—i.e. each individual object may have different value trade-offs within the same drive 100.

Figure 11D:
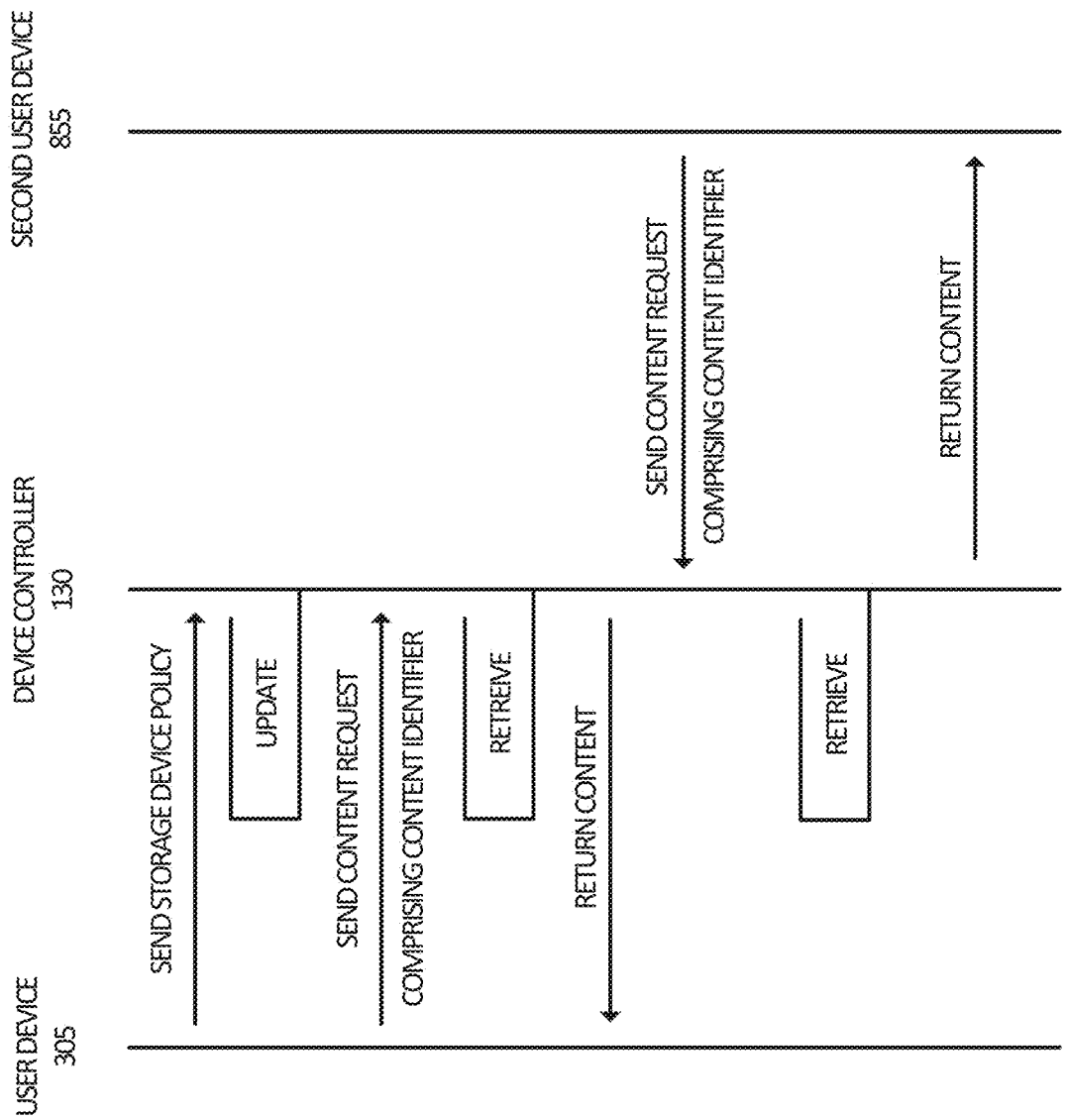
FIG. 11D illustrates an operational sequence in an implementation of a policy-based read.

FIG. 11D illustrates an operational sequence of a policy-based write according to an implementation. The device controller receives a storage device policy from a user device 305. Receiving a storage device policy here can mean receiving an update to a storage device policy already in place. The storage device policy can be part of an overall collection of libraries 700 that create the framework for device controller 130 to operate. In an implementation, a user device 305 provides values for some of the supplied algorithms within the collection of libraries 700, and provides some entirely new rules.

These algorithms and rules are used to update the storage device policy on the device controller 130. In an embodiment, calls to and from one layer of the storage device policy made to a function in another layer of the storage device policy can be linked at the time the layer is loaded in the system. This method of linking at a late time allows for customized code or library entries to be deployed in the device controller 130.

The user device 305 then sends a request to the device controller 130 to retrieve content. At a minimum, this request comprises a content identifier. In an implementation, the device controller 130 needs little information beyond the content identifier itself, but the user may still include any of the storage information provided by the device controller when the content was stored in storage media 110.

The device controller 130 uses the storage device policy to retrieve the content from the storage media 110. The device controller then returns that content to the user device 305.

A second user device 855 then sends a request to the device controller 130 to retrieve content. At a minimum, this request comprises a content identifier. The storage device policy may indicate distinct rules for this content than was used to store the first content. Consequently, the device controller 130 may use different storage device policy rules to retrieve the second requested content than it used to retrieve the first requested content. After retrieving the content, the device controller 130 returns the content to the second user device 855.

Figure 12:
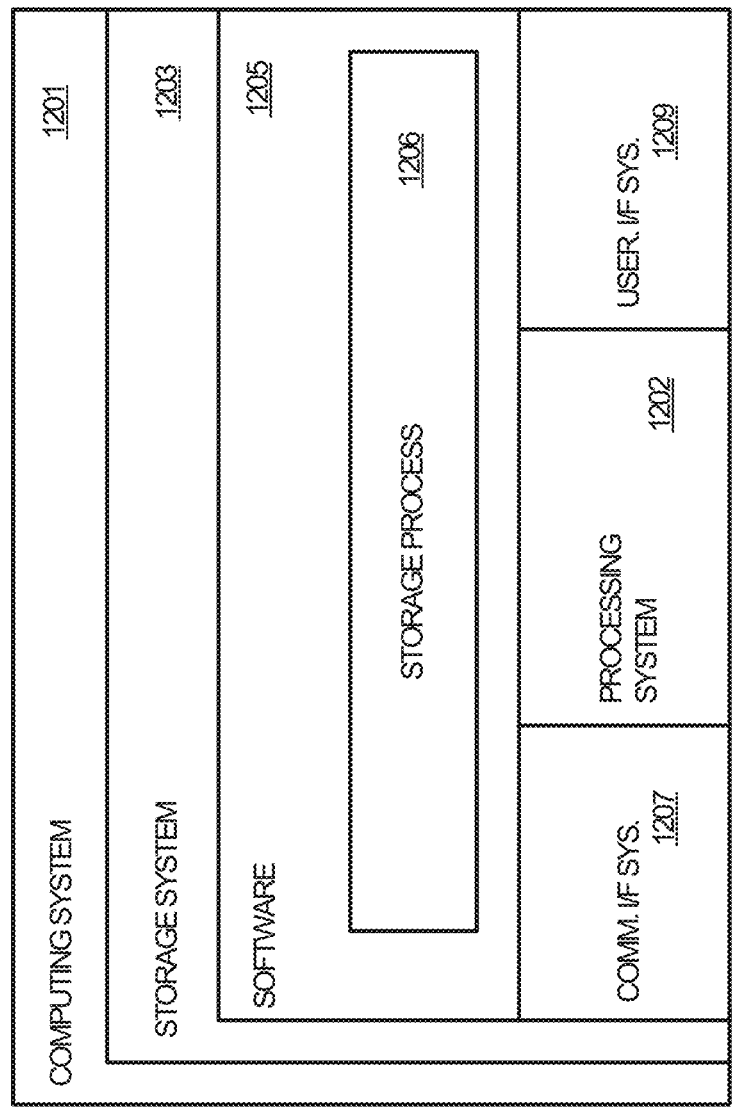
FIG. 12 illustrates a computing system suitable for implementing the policy based storage disclosed herein, including any of the architectures, processes, operational scenarios, and operational sequences illustrated in the Figures and discussed below in the Technical Disclosure.

Referring to FIG. 12, computing system 1202 may comprise a micro-processor and other circuitry that retrieves and executes software 1205 from storage system 1203. Computing system 1202 may be implemented within a single processing device, but may also be distributed across multiple processing devices or sub-systems that cooperate in executing program instructions. Examples of computing system 1202 include general purpose central processing units, application specific processors, and logic devices, as well as any other type of processing device, combinations, or variations thereof.

Storage system 1203 may comprise any computer readable storage media readable by computing system 1202 and capable of storing software 1205. Storage system 1203 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer readable storage media a propagated signal.

In addition to computer readable storage media, in some implementations storage system 1203 may also include computer readable communication media over which at least some of software 1205 may be communicated internally or externally. Storage system 1203 may be implemented as a single storage device, but may also be implemented across multiple storage devices or sub-systems co-located or distributed relative to each other. Storage system 1203 may comprise additional elements, such as a controller, capable of communicating with computing system 1202 or possibly other systems.

Software 1205 may be implemented in program instructions and among other functions may, when executed by computing system 1202, direct computing system 1202 to operate as described with respect to the various operational scenarios, sequences, and processes illustrated herein. For example, software 1205 may include program instructions for implementing and updating storage device policies.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1205 may include additional processes, programs, or components, such as operating system software, virtual machine software, or other application software, in addition to or that include storage process 1206. Software 1205 may also comprise firmware or some other form of machine-readable processing instructions executable by computing system 1202.

In general, software 1205 may, when loaded into computing system 1202 and executed, transform a suitable apparatus, system, or device (of which computing system 1201 is representative) overall from a general-purpose computing system into a special-purpose computing system enhance calendars of interest. Indeed, encoding software 1205 on storage system 1203 may transform the physical structure of storage system 1203. The specific transformation of the physical structure may depend on various factors in different implementations of this description. Examples of such factors may include, but are not limited to, the technology used to implement the storage media of storage system 1203 and whether the computer-storage media are characterized as primary or secondary storage, as well as other factors.

For example, if the computer readable storage media are implemented as semiconductor-based memory, software 1205 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1207 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 1209 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 1209. In some cases, the input and output devices may be combined in a single device, such as a display capable of displaying images and receiving touch gestures. The aforementioned user input and output devices are well known in the art and need not be discussed at length here.

Communication between computing system 1201 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

The included descriptions and figures depict specific embodiments to teach those skilled in the art how to make and use the best mode. By way of example, many of the implementations discussed described a magnetic hard disk drive. The discussion should also be ready to include other types of storage, such solid-state drives. For the purpose of teaching inventive principles, some conventional aspects have been simplified or omitted. Those skilled in the art will appreciate variations from these embodiments that fall within the scope of the invention. Those skilled in the art will also appreciate that the features described above may be combined in various ways to form multiple embodiments. As a result, the invention is not limited to the specific embodiments described above, but only by the claims and their equivalents.

What is claimed is:

1. A solid-state drive comprising:
a solid-state memory;
a device memory;
a programmable processor operatively coupled to the device memory;
a device controller operatively coupled with the solid-state memory and the programmable processor; and
an application stored on the device memory comprising instructions that, when executed by the programmable processor, direct the programmable processor to:
process content for storage based on a storage policy;
transfer the content to the device controller; and
the device controller to:
receive the content from the programmable processor; and
store the content on the solid-state memory.

2. The solid-state drive of claim 1 wherein:
the device controller is to:
read requested content from the solid-state memory;
transfer the requested content to the programmable processor; and
the instructions further direct the programmable processor to:
receive the requested content from the programmable processor;
process the requested content for transfer based on the storage policy; and
transfer the requested content.

3. The solid-state drive of claim 2 wherein:
the instructions further direct the programmable processor to:
process the requested content to identify portions of the requested content that comprise search criteria; and
transfer the portions of the content that comprise the search criteria.

4. The solid-state drive of claim 3 wherein the search criteria comprise one or more of a word, a phrase, or a photo.

5. The solid-state drive of claim 1 wherein:
the instructions further direct the programmable processor to:
compress the content based on the storage policy;
transfer the compressed content to the device controller; and
the device controller is to:
receive the compressed content from the programmable processor; and
store the compressed content on the solid-state memory.

6. The solid-state drive of claim 5 wherein:
the device controller is to:
read the compressed content from the solid-state memory; and
transfer the compressed content to the programmable processor; and
the instructions further direct the programmable processor to:
receive the compressed content from the device controller;
decompress the content based on the storage policy; and
transfer the decompressed content.

7. The solid-state drive of claim 1 wherein:
the instructions further direct the programmable processor to:
encrypt the content based on the storage policy; and
transfer the encrypted content to the device controller; and
the device controller is to:
receive the encrypted content from the programmable processor; and
store the encrypted content on the solid-state memory.

8. The solid-state drive of claim 7 wherein:
the device controller is to:
read the encrypted content from the solid-state memory; and
transfer the encrypted content to the programmable processor; and
the instructions further direct the programmable processor to:
receive the encrypted content from the device controller;
decrypt the content; and
transfer the decrypted content.

9. The solid-state drive of claim 1 further comprising:
a communication interface to communicatively couple the solid-state drive to a host device;
a data link to communicatively couple the programmable processor and the device controller;
a printed circuit board to mount the solid-state memory, the device memory, the device controller, the programmable processor, and the data link; and
a case to mount the printed circuit board and the communication interface.

10. The solid-state drive of claim 1 wherein the content comprises one or more of video data, image data, on-line temporal video data, cached data, financial data, online transaction data, credit card data, or medical data.

11. A method of operating a solid-state drive, the method comprising:
in response to a storage request comprising content, processing the content based on a storage policy;
storing the processed content on the solid-state memory;
in response to a read request, reading requested content from the solid-state memory;
processing the requested content for transfer based on the storage policy; and
transferring the requested content.

12. The method of claim 11 wherein:
the read request comprises search criteria;
processing the requested content for transfer based on the storage policy comprises processing the requested content to identify portions of the requested content that comprise the search criteria; and
transferring the requested content comprises transferring the portions of the content that comprise the search criteria.

13. The method of claim 12 wherein the search criteria comprise one or more of a word, a phrase, or a photo.

14. The method of claim 11 wherein:
processing the content based on the storage policy comprises compressing the content based on the storage policy;
storing the processed content on the solid-state memory comprises storing the compressed content on the solid-state memory;
reading requested content from the solid-state memory comprises reading the compressed content from the solid-state memory;
processing the requested content for transfer based on the storage policy comprises decompressing the compressed content based on the storage policy; and
transferring the requested content comprises transferring the decompressed content.

15. The method of claim 11 wherein:
processing the content based on the storage policy comprises encrypting the content based on the storage policy;
storing the processed content on the solid-state memory comprises storing the encrypted content on the solid-state memory;
reading requested content from the solid-state memory comprises reading the encrypted content from the solid-state memory;
processing the requested content for transfer based on the storage policy comprises decrypting the encrypted content based on the storage policy; and
transferring the requested content comprises transferring the decrypted content.

16. The method of claim 11 wherein the storage policy indicates how to process content for storage on the solid-state drive and how to process the requested content for transfer.

17. The method of claim 16 wherein the storage policy comprises one or more of an encryption policy, a decryption policy, a compression policy, or a decompression policy.

18. The method of claim 17 further comprising retrieving the storage policy from memory.

19. The method of claim 17 wherein the storage request comprises the storage policy.

20. A solid-state drive comprising:
a solid-state memory;
a device memory;
a programmable processor operatively coupled to the device memory;
a device controller operatively coupled with the solid-state memory and the programmable processor; and
instructions stored on the device memory that, when executed by the programmable processor, direct the programmable processor to:
process content for storage on the solid-state memory based on a storage policy;
transfer the content to the device controller to store on the solid-state memory;
in response a content request, receive requested content read from the solid-state memory by the device controller;
process the requested content for transfer based on the storage policy; and
transfer the requested content.

* * * * *